(12) United States Patent
Noveck

(10) Patent No.: US 9,100,330 B1
(45) Date of Patent: Aug. 4, 2015

(54) INTRODUCTION OF READ DELAY OR WRITE DELAY IN SERVERS OF A GEOGRAPHICALLY DISTRIBUTED DATA PROCESSING SYSTEM SO THAT CLIENTS READ UP-TO-DATE DATA

(75) Inventor: David B. Noveck, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 203 days.

(21) Appl. No.: 13/549,079

(22) Filed: Jul. 13, 2012

(51) Int. Cl.
*H04L 12/841* (2013.01)
*H04L 12/823* (2013.01)
*G06F 13/00* (2006.01)

(52) U.S. Cl.
CPC .............. *H04L 47/283* (2013.01); *H04L 47/32* (2013.01); *G06F 13/00* (2013.01)

(58) Field of Classification Search
CPC ..... G06F 11/1076; G06F 11/00; G06F 13/00; G06F 3/00; G06F 11/004; G06F 13/38; G06F 15/00; G06F 15/16; G06F 15/17306; G06F 15/17325; G06F 17/00; G06F 17/60; G06F 19/00; H04L 7/00; H04L 1/00–1/0002; H04L 1/0023–1/0027; H04L 1/0032; H04L 1/004; H04L 1/0041; H04L 1/0045; H04L 2001/0092; H04L 7/0012; H04L 7/0016; H04L 7/0033–7/0041; H04L 47/00; H04L 47/24–47/25; H04L 47/283; H04L 47/32; H04L 65/80
USPC ......... 709/201, 212–219, 232, 237, 204–205, 709/210, 223–226, 246, 248; 712/28; 714/28, 1, 47.1, 707, 731, 744; 707/608–619, 624, 625, 640, 641, 652, 707/655–660, 626–628, 633, 637, 665, 687, 707/694–695; 711/100, 126, 130, 135, 150, 711/154–155, 158, 163
See application file for complete search history.

(56) References Cited

U.S. PATENT DOCUMENTS

| | | | | | |
|---|---|---|---|---|---|
| 4,313,135 | A | * | 1/1982 | Cooper | 348/512 |
| 5,513,314 | A | * | 4/1996 | Kandasamy et al. | 714/6.31 |
| 5,913,213 | A | * | 6/1999 | Wikstrom et al. | 707/610 |
| 5,944,789 | A | | 8/1999 | Tzelnic et al. | |
| 5,987,376 | A | * | 11/1999 | Olson et al. | 709/201 |

(Continued)

OTHER PUBLICATIONS

Definition of "statistics" by Collins English Dictionary, 10th edition, 2009.*

(Continued)

*Primary Examiner* — Brian J Gillis
*Assistant Examiner* — Boris Grijalva Lobos
(74) *Attorney, Agent, or Firm* — Richard Auchterlonie; Novak Druce Connolly Bove + Quigg LLP

(57) ABSTRACT

Read delay or write delay is added to server computers of a geographically distributed data processing system so that when writing to a dataset occurs at a first server and reading from the dataset occurs at a second server, the sum of any delay of returning an acknowledgement of completion of each write request and any delay in the reading of data for each read request is at least the data transmission delay between the two servers. For certain client applications such as NFS, the added delay is sufficient to compensate for the transmission delay without the use of a conventional read lock, which would require a round-trip delay. The method can provide an up-to-date global view of the dataset at each of the servers. The method can also provide equal performance of read access and write access at each of the servers.

6 Claims, 16 Drawing Sheets

(56) References Cited

U.S. PATENT DOCUMENTS

| | | | |
|---|---|---|---|
| 6,029,175 A | 2/2000 | Chow et al. | |
| 6,047,316 A * | 4/2000 | Barton et al. | 709/216 |
| 6,389,420 B1 * | 5/2002 | Vahalia et al. | 1/1 |
| 6,601,070 B2 | 7/2003 | Zhang et al. | |
| 6,625,604 B2 | 9/2003 | Muntz et al. | |
| 6,842,754 B2 | 1/2005 | Muntz | |
| 6,883,029 B2 | 4/2005 | Karamanolis et al. | |
| 6,934,766 B1 * | 8/2005 | Russell | 709/246 |
| 6,985,914 B2 | 1/2006 | Venkatesh et al. | |
| 7,024,525 B2 * | 4/2006 | Yoder et al. | 711/156 |
| 7,120,631 B1 * | 10/2006 | Vahalia et al. | 1/1 |
| 7,130,905 B2 * | 10/2006 | Dinker et al. | 709/225 |
| 7,240,114 B2 | 7/2007 | Karamanolis et al. | |
| 7,240,238 B2 | 7/2007 | Yanai et al. | |
| 7,313,557 B1 | 12/2007 | Noveck | |
| 7,403,946 B1 * | 7/2008 | Taylor | 707/612 |
| 7,730,258 B1 | 6/2010 | Smith et al. | |
| 7,921,179 B1 * | 4/2011 | Zheng et al. | 709/213 |
| 7,979,546 B2 * | 7/2011 | Hamel et al. | 709/225 |
| 8,015,355 B1 | 9/2011 | Smith et al. | |
| 8,078,813 B2 * | 12/2011 | LeCrone et al. | 711/162 |
| 8,086,661 B2 * | 12/2011 | Holenstein et al. | 709/201 |
| 8,099,388 B2 * | 1/2012 | Shen et al. | 707/636 |
| 8,161,236 B1 | 4/2012 | Noveck et al. | |
| 8,244,999 B1 * | 8/2012 | Chatterjee et al. | 711/162 |
| 8,495,021 B2 * | 7/2013 | Srivastava et al. | 707/640 |
| 8,542,695 B1 * | 9/2013 | Melick et al. | 370/428 |
| 2001/0047412 A1 * | 11/2001 | Weinman, Jr. | 709/225 |
| 2004/0210724 A1 * | 10/2004 | Koning et al. | 711/153 |
| 2005/0131802 A1 * | 6/2005 | Glodjo | 705/37 |
| 2005/0289197 A1 * | 12/2005 | Kan et al. | 707/204 |
| 2006/0059270 A1 * | 3/2006 | Pleasant et al. | 709/237 |
| 2007/0255783 A1 * | 11/2007 | Kamvysselis | 709/201 |
| 2009/0138666 A1 * | 5/2009 | Dor et al. | 711/154 |
| 2010/0124196 A1 * | 5/2010 | Bonar et al. | 370/329 |
| 2011/0087787 A1 * | 4/2011 | Lubbers et al. | 709/226 |
| 2011/0137879 A1 * | 6/2011 | Dubey et al. | 707/704 |
| 2011/0145130 A1 * | 6/2011 | Glodjo et al. | 705/37 |
| 2011/0208996 A1 * | 8/2011 | Hafner et al. | 714/6.24 |
| 2012/0042139 A1 * | 2/2012 | Coronado et al. | 711/162 |
| 2012/0127260 A1 * | 5/2012 | Leclerc et al. | 348/14.08 |
| 2012/0137007 A1 * | 5/2012 | Schanen | 709/226 |
| 2012/0246276 A1 * | 9/2012 | Matsubara et al. | 709/219 |
| 2012/0296868 A1 * | 11/2012 | Holenstein et al. | 707/611 |
| 2012/0303576 A1 * | 11/2012 | Calder et al. | 707/611 |
| 2012/0303577 A1 * | 11/2012 | Calder et al. | 707/613 |
| 2014/0040343 A1 * | 2/2014 | Nickolov et al. | 709/201 |

OTHER PUBLICATIONS

Nowicki, Bill, "NFS: Network File System Protocol Specification," Network Working Group, Request for Comments: 1094, Mar. 1989, 27 pages, Sun Microsystems, Inc., Mountain View, CA.

Callaghan et al., "NFS Version 3 Protocol Specification," Network Working Group, Request for Comments: 1813, Jun. 1995, 113 pages, Sun Microsystems, Inc., Mountain View, CA.

Shepler et al., "Network File System (NFS) version 4 Protocol," Network Working Group, Request for Comments: 3530, Apr. 2003, 245 pages, The Internet Society, Reston, VA.

Shepler et al., "Network File System (NFS) Version 4 Minor Version 1 Protocol, Internet Engineering Task Force (IETF)," Request for Comments: 5661, Jan. 2010, 618 pages, IETF Trust, The Internet Society, Reston, VA.

Shepler et al., "Network File System (NFS) Version 4 Minor Version 1 External Data Representation Standard (XDR) Description," Internet Engineering Task Force (IETF), Request for Comments: 5662, Jan. 2010, 74 pages, IETF Trust, The Internet Society, Reston, VA.

Roy et al., "State Management in a Distributed UNIX System," Proceedings of the 29th Annual Hawaii International Conference on System Sciences (HICSS-29), vol. 1: Software Technology and Architecture, Jan. 3-6, 1996, Maui, Hawaii, 10 pages, IEEE Computer Society, IEEE, New York, NY.

Schneider, David, "The Microsecond Market," IEEE Spectrum, Jun. 13, 2012, 2 pages, IEEE, New York, NY.

Wechsler, Jill, "The Role of GPS in Precise Time and Frequency Dissemination," GPS World, Jul./Aug. 1990, 8 pages, North Coast Media, Cleveland, Ohio.

Segal et al., "PowerQUICC (TM) Data Cache Coherency," Application Note No. AN3544, Dec. 2007, 12 pages, Freescale Semiconductor, Tempe, AZ.

* cited by examiner

INTRODUCTION OF READ DELAY OR WRITE DELAY IN SERVERS OF A GEOGRAPHICALLY DISTRIBUTED DATA PROCESSING SYSTEM SO THAT CLIENTS READ UP-TO-DATE DATA

FIELD OF THE INVENTION

The present invention relates to a geographically distributed data processing system in which changes to a dataset are written at a first server computer, transmitted over a distance of at least ten kilometers to a second server computer, and read at the second server computer, and the server computers are operated in such a way as to compensate for undesired effects of the data transmission delay between the first server computer and the second server computer.

BACKGROUND OF THE INVENTION

Distributed data processing systems are well known in which a local server computer provides read-write access to a read-write copy of a dataset, and a geographically remote server computer provides read-only access to a read-only copy of the dataset. In such systems, data written to the local read-write copy of the dataset is automatically transmitted over a data link to the remote server computer in order to update the remote read-only copy after a certain transmission delay. See, for example, Yanai, et al., U.S. Pat. No. 7,240,238 issued Jul. 3, 2007, entitled Remote Data Mirroring System.

One objective of a remote data mirroring system is to provide data availability and data recovery in case of a failure of the local server computer especially due to a disaster. An additional objective, for many applications, is to provide remote clients with a read-only copy of the dataset that the remote clients may frequently access instead of accessing the local read-write copy. In this case the loading upon the local server computer is reduced and the loading upon the data network between the local server computer and the remote client is also reduced. If a remote client would need to write to the dataset, for example to execute a read-write transaction upon the dataset, then the remote client may communicate directly with the local server to place a lock upon a portion of the read-write copy of the dataset in order to read data from the locked portion of the dataset and then to write new data to the locked portion of the dataset.

Distributed data processing systems are also known in which a file system is distributed over multiple server computers so that each server computer provides client access to a respective portion of the directories and regular files in the file system. For example, each server computer provides access to a respective file system cell, and the file system cells are linked together to form a meta-filesystem that appears to a user or application program to be a single file system. A server computer responds to a directory access request from a client for access to a directory in its file system cell by returning a file handle containing a file system cell ID and a pointer to a file in the file system cell identified by the file system cell ID. A subsequent client request including this file handle is routed to the server computer providing access to the file system cell identified by the file system cell ID in this file handle. See, for example, Venkatesh, et al., U.S. Pat. No. 6,985,914 issued Jan. 10, 2006, entitled "Cluster meta file system of file system cells managed by respective data movers of a network file server."

Distributed processing systems are also known in which more than one server computer may provide clients with read-write access to the same directories and regular files in the same file system. For example, server computers in a cluster share access to the same file system in the same data storage, and each of these server computers maintains a local cache of file directory information including locking information of locked files that are accessible through the server computer. A cache consistency scheme ensures that shared locking information is consistent in the local caches. For example, cache consistency messages are passed among the server computers. See, for example, Tzelnic, et al., U.S. Pat. No. 5,944,789 issued Aug. 31, 1999, entitled "Network File Server Maintaining Local Caches of File Directory Information in Data Mover Computers."

SUMMARY OF THE INVENTION

It has been discovered that for some client applications accessing server computers in a geographically distributed data processing system, it is desirable to add write delay or read delay so that the sum of any write delay and any read delay is at least the data transmission delay between server computers in the system. For these applications, the read or write delay compensates for certain undesired effects of the data transmission delay, which become significant for server computers spaced by at least ten kilometers. At such a spacing, the delay over a high-speed fiber optic data link is about 50 microseconds, which is significant in comparison to the few hundreds of microseconds required for a client to read a block of data from server cache or write a block of data to server cache.

Client applications sensitive to the data transmission delay in such a geographically distributed data processing system include applications that are designed to avoid client locking when the client is serviced by a single server computer, yet require read access to an up-to-date version of the dataset to avoid performance degradation. For example, performance degradation may result for such an application when a client at a second server computer reads data that has already been overwritten at a first server computer. A data transmission delay of at least 50 microseconds between these two server computers will increase the likelihood of the client at the second server computer reading data that has already been overwritten at the first server computer. It is desired to compensate for the data transmission delay without the use of a conventional read lock, which would require a round-trip delay between the geographically spaced servers in order for the client at the second computer to request a lock from the first server computer and to receive back a grant of the requested lock from the first server computer.

In accordance with a first aspect, the invention provides a method of operation in a geographically distributed data processing system. The geographically distributed data processing system includes a first server computer linked to a first client computer, a second server computer linked to a second client computer, and a data transmission link from the first server computer to the second server computer. The second server computer is physically spaced from the first digital computer by more than ten kilometers so that there is a significant data transmission delay from the first server computer to the second server computer. The first server computer has a first data processor and program storage media storing a first set of computer instructions, and the second server computer has a second data processor and program storage media storing a second set of computer instructions. The method includes the first data processor executing the first set of computer instructions to respond to write requests from the first client computer by writing a series of changes to a dataset and returning to the first client computer an acknowledgement of completion of each of the write requests, and transmitting the series of changes to the dataset over the data transmission link to the second data processor. The method further includes the second data processor executing the second set of computer instructions to receive the series of changes to the dataset from the first data processor, and to respond to read requests from the second client computer to read data from the dataset and return the data read for each of the read requests to the second client computer. In addition, execution of at least one of the first set of computer instructions by the first data processor and the second set of computer instructions by the second data processor delays at least one of the returning to the first client computer the acknowledgement of completion of each of the write requests and the reading of the data from the dataset for each of the read requests so that the sum of any delay of the returning to the first client computer the acknowledgement of completion of each of the write requests and any delay in the reading of the data from the dataset for each of the read requests is at least the data transmission delay from the first server computer to the second server computer, so that the read data returned for each of the read requests includes changes for write requests acknowledged as completed by the first data processor before each of the read requests is received by the second data processor, and the read data returned for each of the read requests does not include changes for write requests received by the first data processor after each of the read requests is received by the second data processor.

In accordance with another aspect, the invention provides a method of operation in a geographically distributed data processing system. The geographically distributed data processing system includes a first server computer linked to a first client computer, a second server computer linked to a second client computer, a third server computer linked to a third client computer, a first data transmission link from the first server computer to the second server computer, and a second data transmission link from the first server computer to the third server computer. The second server computer is physically spaced from the first server computer by more than ten kilometers so that there is a first data transmission delay from the first server computer to the second server computer. The third server computer is physically spaced from the first server computer by more than ten kilometers so that there is a second data transmission delay from the first server computer to the third server computer. The physical spacing between the third server computer and the first server computer is greater than the physical spacing between the second server computer and the first server computer so that the second data transmission delay is greater than the first data transmission delay. The first server computer has a first data processor and program storage media storing a first set of computer instructions, and the second server computer has a second data processor and program storage media storing a second set of computer instructions, and the third server computer has a third data processor and program storage media storing a third set of computer instructions. The method includes the first data processor executing the first set of computer instructions to respond to write requests from the first client computer by writing a series of changes to a dataset and returning to the first client computer an acknowledgement of completion of each of the write requests, and transmitting the series of changes to the dataset over the first data transmission link to the second data processor and transmitting the series of changes to the dataset over the second data transmission link to the third data processor. The method further includes the second data processor executing the second set of computer instructions to receive the series of changes to the dataset from the first data processor, and to respond to read requests from the second client computer to read data from the dataset and return to the second client computer the data read for each of the read requests from the second client computer. The method further includes the third data processor executing the third set of computer instructions to receive the series of changes to the dataset from the first data processor, and to respond to read requests from the third client computer to read data from the dataset and return to the third client computer the data read for each of the read requests from the third client computer. In addition, execution of the first set of computer instructions by the first data processor delays returning to the first client computer the acknowledgement of completion of each of the write requests by at least the second data transmission delay from the first server computer to the third server computer, and execution of the second set of computer instructions by the second data processor delays returning to the second client computer the reading of the data from the dataset for each of the read requests from the second client computer so that the changes become accessible to the second client computer and the third client computer simultaneously at the second server computer and the third server computer.

In accordance with a final aspect, the invention provides a geographically distributed data processing system. The geographically distributed data processing system includes a first server computer for servicing requests from a first client computer, a second server computer for servicing requests from a second client computer, and a data transmission link from the first server computer to the second server computer. The second server computer is physically spaced from the first server computer by more than ten kilometers so that there is a significant data transmission delay from the first server computer to the second server computer. The first server computer has a first data processor and program storage media storing a first set of computer instructions executed by the first data processor. The second server computer has a second data processor and program storage media storing a second set of computer instructions executed by the second data processor. The first set of computer instructions, when executed by the first data processor, respond to write requests from the first client computer by writing a series of changes to a dataset and returning to the first client computer an acknowledgement of completion of each of the write requests, and transmitting the series of changes to the dataset over the data transmission link to the second data processor. The second set of computer instructions, when executed by the second data processor, receive the series of changes to the dataset from the first data processor, and respond to read requests from the second client computer to read data from the dataset and return the data read for each of the read requests to the second client computer. Execution of at least one of the first set of computer instructions by the first data processor and the second set of computer instructions by the second data processor delays at least one of the returning to the first client computer the acknowledgement of completion of each of the write requests and the reading of the data from the dataset for each of the read requests so that the sum of any delay of the returning to the first client computer the acknowledgement of completion of each of the write requests and any delay in the reading of the data from the dataset for each of the read requests is at least the data transmission delay from the first server computer to the second server computer, so that the read data returned for said each of the read requests includes changes for write requests acknowledged as completed by the first data processor before said each of the read requests is received by the second data processor, and the read data returned for said each of the read requests does not include changes for write requests received by the first data processor after said each of the read requests is received by the second data processor.

BRIEF DESCRIPTION OF THE DRAWINGS

Additional features and advantages of the invention will be described below with reference to the drawings, in which.

Figure 1:
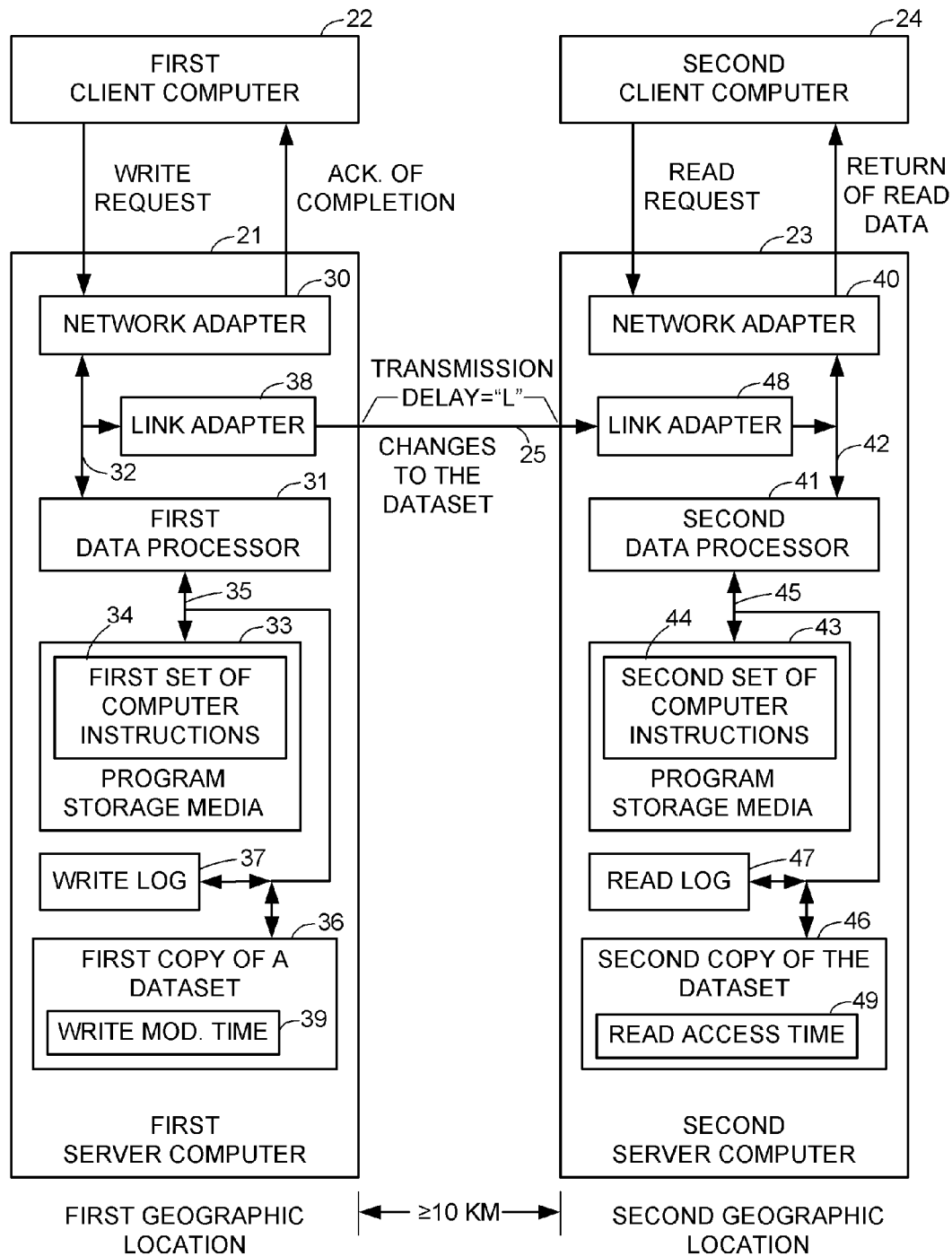
FIG. 1 is a block diagram of two physically-spaced server computers in a geographically distributed data processing system incorporating the present invention.

While the invention is susceptible to various modifications and alternative forms, specific embodiments thereof have been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

As introduced above, for some client applications accessing server computers physically spaced by more than ten kilometers in a geographically distributed data processing system, it is desirable to add write delay or read delay so that the sum of any write delay and any read delay is at least the data transmission delay between the physically-spaced server computers. Although such a geographically distributed data processing system may have more than two physically-spaced server computers, many of the principles of operation and advantages of the invention can be understood with reference to just two of the physically-spaced server computers in such a system. Therefore the detailed description below begins in FIG. 1 with consideration of such a first server computer 21 and a second server computer 23.

As shown in FIG. 1, a geographically distributed data processing system includes at least a first server computer 21 at a first geographic location, and a second server computer 23 at a second geographic location. The second server computer 23 is physically spaced from the first server computer 21 by at least ten kilometers. A first client computer 22 at the first geographic location is linked to the first server computer 21 for writing data to a dataset by sending a write request to the first server computer 21. A second client computer 24 at the second geographic location is linked to the second server computer 23 for reading data from the dataset by sending a read request to the second server computer 23. A data transmission link 25 conveys changes to the dataset from the first server computer 21 to the second server computer 23.

Because the second server computer 23 is physically spaced from the first server computer 23 by at least ten kilometers, there is a significant data transmission delay "L" over the data transmission link 25. According to present scientific theory, this data transmission delay is no less than the physical spacing between the first server computer 21 and the second server computer 23 (>ten kilometers), divided by the speed of light in a vacuum (about 300,000 kilometers/second). Therefore the data transmission delay "L" is at least 33 microseconds. Presently, single-mode optical fiber is the transmission medium of choice for reliable high-speed data transmission over at least ten kilometers. The speed of light in such single-mode optical fiber is about 1.6 times slower than the speed of light in a vacuum. Therefore, the data transmission delay "L" is at least 50 microseconds for such a single-mode optical fiber data transmission link.

In practice, the first and second server computers 21, 23 could be located anywhere on the Earth. If the first and second server computers 21, 23 were located on opposite sides of the Earth, then the transmission delay "L" over a dedicated fiber optic link would be at least 100 milliseconds. In addition, one-way transcontinental latencies over a shared link often exceed 100 milliseconds. If the dataset changes were propagated synchronously in these cases, the latency would be doubled by the additional time needed to receive back an acknowledgement of receipt of each change. This round-trip latency would reduce throughput prohibitively.

For example, if a local write operation would take 5 milliseconds, and the round-trip latency were 50 milliseconds, then the effective latency would be 55 milliseconds, which would reduce the throughput by over ten times. For applications such as file sharing, throughput and efficient access are often more important than strict consistency of the dataset over the distributed system, so changes to the dataset are propagated asynchronously over the data link 25. There is no round-trip latency for the asynchronous propagation; instead, the asynchronous propagation has just the one-way latency of "L". So by using asynchronous propagation instead of synchronous propagation, for the case of the 5 millisecond local write operation, the one-way latency would be 25 milliseconds and the effective latency would be 30 milliseconds.

FIG. 1 further shows that the first server computer 21 includes a network adapter 30, a first data processor 31, program storage media 33, and a link adapter 38. The network adapter 30 links the first client computer 22 to the first server computer 21 for communication using the Ethernet protocol. The link adapter 38 links the first server computer 21 to the data transmission link 25 for using a data transmission protocol such as ESCON for supporting asynchronous data transmission. The network adapter 30 and the link adapter 38 are attached to an input/output bus 32 of the first data processor 31. The first data processor 31 is a general purpose digital computer data processor including one or more core central processing units (CPUs) for executing a first set of computer program instructions 34 stored in program storage media 33. The program storage media 33 is non-transitory computer readable storage media, such as electrically erasable and programmable read-only memory (EEPROM). The program storage media 33 is attached to a memory bus 35 of the first data processor 31.

The first server computer 21 also has non-volatile random access memory storing a write log or queue 37 and non-volatile random access memory or storage storing a first copy of a dataset 36. The write log or queue 37 keeps a list of client write requests being serviced by the first data processor 31 from the time when the first server computer receives each client request until the time when the first server computer returns an acknowledgement of completion of the write request to the client computer that originated the request. The write operation that is acknowledged as complete is a so-called "fast write" to nonvolatile memory. If the nonvolatile memory is configured as a cache so that the changes of the write operation are written down to storage later, the acknowledgement of completion does not wait for the changes of the write operation to be written down to storage later.

The first server computer 21 returns the acknowledgement of completion of each client write request upon expiration of a certain write delay time "A" after the first server computer receives the client write request. The write delay time "A" can be at least as large as the transmission delay "L". Therefore each write request is time stamped in the write log or queue 37 with the time when the write request was received by the first server computer, in order to perform the return of the acknowledgement of receipt at the desired time by servicing of the write log or queue 37 at a scheduled time.

The second server computer 23 has an internal construction similar to that of the first server computer 21. The second server computer 23 has a network adapter 40, a second data processor 41, program storage media 43, and a link adapter 48. The network adapter 40 links the second client computer 24 to the second server computer 23 for communication using a means of communication, such as Ethernet, supporting the Internet protocol. The link adapter 48 links the second server computer 23 to the data transmission link 25 for receiving the asynchronous data transmission from the first server computer 21. The network adapter 40 and the link adapter 48 are attached to an input/output bus 42 of the second data processor 41. The second data processor 41 is a general purpose digital computer data processor including one or more core central processing units (CPUs) for executing a second set of computer program instructions 44 stored in program storage media 43. The program storage media 43 is non-transitory computer readable storage media, such as electrically erasable and programmable read-only memory (EEPROM). The program storage media 43 is attached to a memory bus 45 of the second data processor 41.

The second server computer 23 also has non-volatile random access memory storing a read log or queue 47 and non-volatile random access memory or storage storing a second copy of the dataset 46. The read log or queue 47 keeps a list of client read requests being serviced by the second data processor 41 from the time when the second server computer receives each client read request until the time when the second server computer returns the requested read data to the client computer that originated the request.

So long as the link adapter 48 receives changes or keep-alive signals indicating that there have been no changes, the second server computer 23 returns the requested read data for each client read request upon expiration of a certain read delay time after the second server computer receives the client read request. The sum of the read delay and the write delay is at least as large as the transmission delay "L". In a preferred implementation, the read delay is the difference "L−A" between the transmission delay and the write delay. Each read request is time stamped in the read log or queue 47 with the time when the read request was received by the second server computer, in order to perform the return of the read data at the desired time by servicing of the read log or queue 47 at a scheduled time.

The first copy of the dataset 36 and the second copy of the dataset 46 can be organized in various ways and the organization can be adapted to the kind of data stored in the dataset. For many applications, it is desirable for the first copy of the dataset 36 to be a full read-write copy of the dataset, and for the second copy of the dataset 46 to be a full read-only copy of the dataset. This organization is preferred for an application in which reading is frequent and writing is infrequent, and it is desired for the read and write latency to be low and relatively constant. One example of such an application is a dataset containing directories and file attributes of a geographically distributed file system. In this case, low read and write latency is obtained by storing the directories and file attributes in a persistent random access memory such as flash. This particular application will be further described below with reference to FIG. 19.

For some applications, it is desirable for the first copy of the dataset 36 or the second copy of the dataset 46 to be organized as a cache so that that the cache stores only a most recently accessed portion of a more complete dataset that is stored elsewhere. The cache organization of the first or second copy of the dataset is desirable for applications that do not need low read or write latency to the entire dataset but should have low read or write latency to a contiguous portion of the dataset after an initial read or write access. Therefore the cache organization is appropriate for applications that have synchronous access rather than random access so that prefetching techniques are effective in reducing the read or write latency after an initial read or write access.

The changes to a dataset that are transmitted between the server computers 21, 23 can be specified in various ways depending on the organization of the dataset. For example, if the dataset contains regular files, then the changes can be specified as read-write operations upon the regular files. If the dataset contains directories or file attributes, then the changes can also be specified by directory or file attribute operations such as directory lookup operations, file creation operations, file rename operations, and file deletion operations. In the case of sending changes to a server computer maintaining a local cache, the changes may also include invalidation operations.

In a preferred implementation, changes to the dataset are transmitted between the server computers 21, 23 using a dedicated data transmission link 25 or a reliable network transmission protocol (such as TCP) over a shared data transmission link 25. In either case, empty data packets or other kinds of "keep alive" messages are transmitted in the absence of changes so that the second server computer 23 maintaining the second copy of the dataset 46 as a read-only copy or a local cache will detect any transmission failure or data link failure in order to deny client requests that are depending on access to an up-to-date version of the dataset.

To make the propagation of the changes to the dataset independent of variations in the transmission delay "L", the first server computer 21 time stamps each change to the dataset, and the first server computer transmits each change to the dataset and its associated timestamp over the data transmission link 25 to the second server computer 23. The second server computer 23 uses this timestamp to schedule when the change to the dataset becomes accessible to the second client computer 24. The timestamp can be the time at which the client write request is received by the first server computer 21, and the changes to the dataset can be specified by sending a copy of the client write request over the data transmission link 25.

The first and second server computers 21, 23 are synchronized to each other or to a common global clock so that the time stamps from the first server computer 21 can be used for precisely scheduling read operations at the second server computer 23. For example, if the data transmission link 25 is a dedicated single-mode fiber optic link having a substantially identical parallel return link, then the transmission delay "L" is constant and can be measured by a round-trip transmission. This measurement of the transmission delay "L" can be used as a time offset for a timestamp transmitted between the two server computers 21, 23. In any case, Global Positioning System (GPS) receivers can be used to provide each of the server computers 21, 23 with a local clock synchronized to a global time base of the GPS system. The GPS system provides local clocks synchronized to each other with a precision of about one microsecond.

The first copy of the dataset 36 or the second copy of the dataset 46 can be especially adapted for scheduling a desired timing or skew between the writing of data at the first server computer 21 and the reading of the data at the second client computer 21. Because timestamps are associated with the changes to the dataset, each of the first server computer 21 and the second server computer has access to information indicating a time when the change is to be effective, and access to the "before" and "after" images of each change. This information can be kept for some duration of time in the first server computer 21 and the second server computer 23.

In one implementation, the first server computer keeps the time stamp and the "after image" in the write log 37 for some time after receipt of each write request, and the second server computer 23 writes the "after image" (i.e., the new data of each change) to the second set of computer instructions immediately upon receipt of each change. However, the "before image" could be saved for some time so that the new data of the change is not written over the "before image".

For example, the second data processor 41 could maintain a cache of metadata about recent changes. The metadata would include the timestamp indicating when the change is made accessible for the usual read operations, a pointer to the "before" image of the changed data, and a pointer to the "after" image of the changed data. For the case of a read request that is pending when the second server computer 23 receives the change, this cache of metadata could be used by the second data processor for selecting whether the data requested by the read request should be read from either the "before" image or the "after" image of a change to the dataset. The cache of metadata could also be made accessible to client applications interested in knowing whether or not a change has occurred to requested data around the time of a client request, and desiring access to both the "before" and "after" image of the requested data if such a change has occurred.

In a preferred implementation, it is desired for the second server computer 23 to never return out-of-date data to the second client computer 24. This requires the keep-alive mechanism to respond very quickly to any failure of the data transmission link 25 or any failure of the link adapter 38 to transmit a data set change so that the data set change is received in a timely fashion by the link adapter 48. The response time of the keep-alive mechanism should be comparable to the time for reception of a single change to the dataset, so that the time it takes for the second server computer 23 to detect a data link failure or a data transmission failure is comparable to the time it takes for the second server computer 23 to receive a single change and write the single change to the second copy of the dataset 46. Consequently, in the absence of changes to the dataset, the keep-alive signal is just as frequent as the changes to the dataset when the changes are frequent.

For example, in the case of a dedicated data transmission link 25, each of the data transmission packets of the data transmission protocol serves as a keep-alive signal. Each of the data packets includes a header including a respective sequence number. The link adapter 38 in the first server computer 21 transmits data packets periodically regardless of whether there are any current changes to the dataset. The link adapter 38 increments the sequence number by one each time when a data packet is transmitted. When no change is transmitted, the data payload of the data packet is empty. The link adapter 48 in the second server computer 23 receives each data packet, and compares the sequence number in the data packet to the sequence number in the preceding data packet. If the link adapter 48 fails to receive a data packet periodically, or receives a data packet without a proper sequence number, then the link adapter 48 detects a data link failure or a data transmission failure. For example, when the link adapter 48 fails to receive a data packet before the expiration of a certain duration of time since the receipt of the previous data packet, then the link adapter 48 detects a data link failure. When such a failure is detected, the second server computer 23 responds to a subsequent read request upon the dataset by returning an error code indicating a data link failure or a data transmission failure.

In the case of a shared data transmission link 25, the link adapter 48 in the second server computer may use a similar mechanism to detect a data link failure or a data transmission failure. In this case, a keep-alive signal for the first server computer 21 is encoded in the data packets transmitted from the first server computer, and the link adapter 48 can distinguish between data packets received from the first server computer 21 and data packets received from any other server computer that is sharing the data transmission link 25. In addition, when the first server computer 21 is not transmitting changes, and instead is periodically transmitting the keep-alive signal, it is desirable to use fewer data packets to transmit the keep-alive signal than would be used for transmitting the changes at the same rate. For example, if each change requires four data packets, then the keep-alive signal uses just one data packet, so that periodic transmission of the keep-alive signal at the same rate as the changes would require one-quarter of the transmission bandwidth.

A shared data transmission link 25 may have a variable data transmission delay. At any given time, the variable transmission delay may depend on whether or not another server computer is transmitting data over the data transmission link 25. In this case the variable transmission delay introduces a difficulty in determining what changes may have been lost due to a link failure or a data transmission failure. Without knowledge of the actual transmission delay, the time of transmission of a data packet cannot be precisely determined from its time of reception. Also, it may be desired to know whether the transmission delay has exceeded a certain limit. For example, if the system of FIG. 1 has been configured for a certain transmission delay "L", then the second server computer 23 may consider a data transmission failure to have occurred once the actual transmission delay exceeds the configured delay "L".

In a preferred implementation, for determining what changes may have been lost due to a link failure or a data transmission failure, each keep-alive signal includes a global time stamp indicating when the keep-alive signal was transmitted. For example, each keep-alive signal is a single data packet that includes the global time stamp. Each change to the dataset also includes a global time stamp. For example, the first data packet for a change includes the global time stamp. The link adapter 48 keeps a copy of the global time stamp of the last keep alive signal or the last change that was received periodically and had a proper sequence number. This global time stamp indicates the last global time when the first server computer was known to be capable of transmitting any changes that would have been received by the second server computer in a timely fashion. Therefore, when the link adapter 48 detects a data link failure or a data transmission failure, the link adapter saves the last global time stamp received prior to the failure. For example, the link adapter 48 detects a data link failure when a data packet of a keep-alive signal or a dataset change is not received before expiration of a certain duration of time since receipt of the previous data packet of a keep-alive signal or a dataset change.

In the absence of a failure, the time of receipt of any pending read request from the second client computer 24 is compared to the time of the last global time stamp from the link adapter 48 to determine whether or not the pending read request is requesting data after the time of the last global time stamp. If the pending read request is requesting data at or before the time of the last global time stamp, then the second server computer reads the second copy of the dataset 46 and returns this read data to the second client computer 24. If the pending read request is requesting data after the time of the last global time stamp, then processing of that read request is delayed until the link adapter 48 provides new value for the last global timestamp and this new value does indicate a time after the time that data is requested by a read request, and once the link adapter 48 provides such a new value for the last global timestamp, then the second copy of the data set 46 is read before any change associated with this last global timestamp is written into the second copy of the dataset, and this data read from the data set 46 is returned to the second client computer 24.

If the actual transmission delay exceeds the configured delay "L", then the read request will be delayed by more than the configured read delay time. If the read request is delayed by more than the configured read delay time, then this occurrence is logged as a warning of an excessive transmission delay. If the read request is delayed by more than a certain timeout interval after the configured read delay time, then the read request is aborted and an error code indicating a timeout error is returned to the second client computer 24.

Once a data link error or data transmission error is detected, if the pending read request is requesting data at or before the time of the global time stamp received by the link adapter 48 prior to the failure, then the second server computer reads the second copy of the dataset 46 and returns this read data to the second client computer 24. If the pending read request is requesting data after the time of the last global time stamp received prior to the failure, then the read operation is aborted and an error code indicating a data link error or a data transmission error is returned to the second client computer 24. Once proper transmission over the data transmission link 25 is re-established, the last global time stamp received prior to the failure is included in a recovery request sent back to the first server computer 21. In response to the recovery request, the first server computer 21 temporarily suspends client read-write access to the dataset in order to re-transmit changes in the write log 37, beginning with the first change after the last global time stamp received prior to the failure. The re-transmission begins with a special data packet including the last global time stamp received prior to the failure and indicating to the link adapter 48 that re-transmission is beginning and client read access may resume at the second client computer 23. The re-transmission continues with the first change after the last global time stamp. The time stamps re-transmitted with the changes from the write log are the original time stamps from the write log, and not new time stamps indicating the times of re-transmission of the changes. Recovery is finished and client read-write access is resumed in the first server computer 21 once the end of changes has been reached in the write log 37.

Client applications sensitive to the data transmission delay "L" in the geographically distributed data processing system of FIG. 1 include applications that are designed to avoid client locking when the client is serviced by a single server computer, yet require read access to an up-to-date version of the dataset to avoid performance degradation. A data transmission delay of at least 50 microseconds between the first server computer 21 and the second server computer 23 will increase the likelihood of performance degradation for such an application when the second client computer 24 reads data that has already been overwritten at the first server computer.

An example of such an application is a client computer using the industry standard Network File System (NFS) protocols for access to a network file server. NFSv2 is described in Bill Nowicki, "NFS: Network File System Protocol Specification," NETWORK WORKING GROUP, Request for Comments: 1094, SUN MICROSYSTEMS, Inc., Mountain View, Calif., March 1989. NFSv3 is described in B, Callaghan et al., "NFS Version 3 Protocol Specification," Network Working Group, Request for Comments: 1813, SUN MICROSYSTEMS, Inc., Mountain View, Calif., June 1995. NFSv4 is described in S. Shepler et al., "Network File System (NFS) version 4 Protocol," Network Working Group, Request for Comments: 3530, The INTERNET SOCIETY, Reston, Va., April 2003. NFSv4.1 is described in S. Shepler et al., "Network File System (NFS) Version 4 Minor Version 1 Protocol," INTERNET ENGINEERING TASK FORCE (IETF), Request for Comments: 5661, IETF Trust, The INTERNET SOCIETY, Reston, Va., January 2010, and S. Shepler et al., "Network File System (NFS) Version 4 Minor Version 1 External Data Representation Standard (XDR) Description," INTERNET ENGINEERING TASK FORCE (IETF), Request for Comments: 5662, IETF Trust, INTERNET SOCIETY, Reston, Va., January 2010. Performance degradation may result for the NFS application in the second client computer 24 if the second client computer 24 reads directory information from the dataset when that directory information has already been overwritten at the first server computer 21.

For clients that are sensitive to the data transmission delay "L" in the geographically distributed data processing system of FIG. 1, it is desired to compensate for the data transmission delay "L" without the use of a conventional read lock. A conventional read lock would require a round-trip delay between the geographically spaced server computers 21, 23 in order for the second client computer 24 to request the read lock from the first server computer 21, and receive a "lock grant" in return from the first server computer. In FIG. 1, the data transmission delay "L" is compensated for without the use of a conventional read lock by the first data processor 31 delaying the returning to the first client computer 22 the acknowledgement of completion of each of the write requests, or the second data processor 41 delaying the reading of the data from the dataset for each of the read requests, so that the sum of any delay of the returning to the first client computer the acknowledgement of completion of each of the write requests and any delay in the reading of the data from the dataset for each of the read requests is at least the data transmission delay "L" from the first server computer 21 to the second server computer 22, so that the read data returned for each of the read requests includes changes for write requests acknowledged as completed by the first data processor before the read requests is received by the second data processor, and the read data returned for each of the read requests does not include changes for write requests received by the first data processor after the read request is received by the second data processor.

There are a number of possible ways of dividing the transmission delay between write delay and read delay. In general, the most desirable way of dividing the transmission delay will depend primarily upon the application, the read access frequency and the write access frequency, and to a lesser extent statistics of the frequency distribution of read access and write access. For some applications, it is desirable for the write delay to be the transmission delay, and the read delay to be zero. For other applications, it is desirable for the write delay to be zero, and for the read delay to be the transmission delay. For some applications, the transmission delay can be split up between the read delay and the write delay, and dynamically adjusted.

Depending on the way that the transmission delay is divided between the write delay and the read delay, there is also a design choice as to when a write operation is effective, or when a read operation is effective. If there is a write delay, then the time at which the write is effective, generally known as the write modification time, can be scheduled to occur within the write delay interval between the time when the first server computer 21 receives the write request, and the time when the first server computer returns the acknowledgement of completion of the write request. If there is a read delay, then the time at which the read operation is effective, generally known as the read access time, can be scheduled to occur within the read delay interval between the time when the second server computer 23 receives a read request and the time when the second server computer returns the requested read data. In addition, for the terms "write modification time" and "read access time" to have the same meaning in the context of a geographically distributed data processing system that these terms have in the context of a single server computer, the geographically distributed data processing system should present a consistent global view of the dataset to the client computers 22, 24 at different geographic locations.

For the case where the write delay is the transmission delay "L" and the read delay is zero, one may schedule the write modification time to be the time when the first client computer returns the acknowledgement of completion to the first client computer 22. This is consistent with a global view that the data should appear to change in the first server computer 21 when the changes are received and become accessible in the second server computer 23. This is also consistent with a user expectation that a server computer should return an acknowledgement of completion of a write request immediately once the write operation has been completed.

For the case where the write delay is zero and the read delay is the transmission delay "L", one may consider the read access time to be the time when the second client computer receives the read request. When the first server computer 21 writes new data to the dataset, the change becomes accessible in the second server computer 23 after the transmission delay "L". Therefore, consistent with a global view of the dataset, if the second client computer receives a read request for this data before the write modification time, then the second client computer should return the old data, and if the second client computer receives a read request for this data after the write modification time, then the second client computer should return the new data.

For the case where the data transmission delay is split between the write delay and the read delay in any proportion, an application obtains a consistent global view of the dataset when the write modification time is considered to be the time when the first computer server 21 returns the acknowledgement of completion of the write operation, the read access time is considered to be the time when the second server computer 23 receives the read request. In this case, the second server computer 23 schedules the servicing of each read request to return the "old" data if the read request is received before the first computer server 21 returns the acknowledgement of completion of the write operation, and to return the "new" data from the change of the write request if the second server computer receives the read request after the first computer server 21 returns the acknowledgement of completion of the write operation. If these particular read-write semantics are sufficient for a client application in a geographically distributed data processing system having about the same read access frequency and write access frequency, then a preferred design choice is to split the data transmission delay between the write delay and the read delay. These particular read-write semantics can also be chosen for the case where the write delay is always zero and the read delay is always the data transmission delay "L", and for the case where the write delay is always the data transmission delay "L" and the read delay is always zero.

Figure 2:
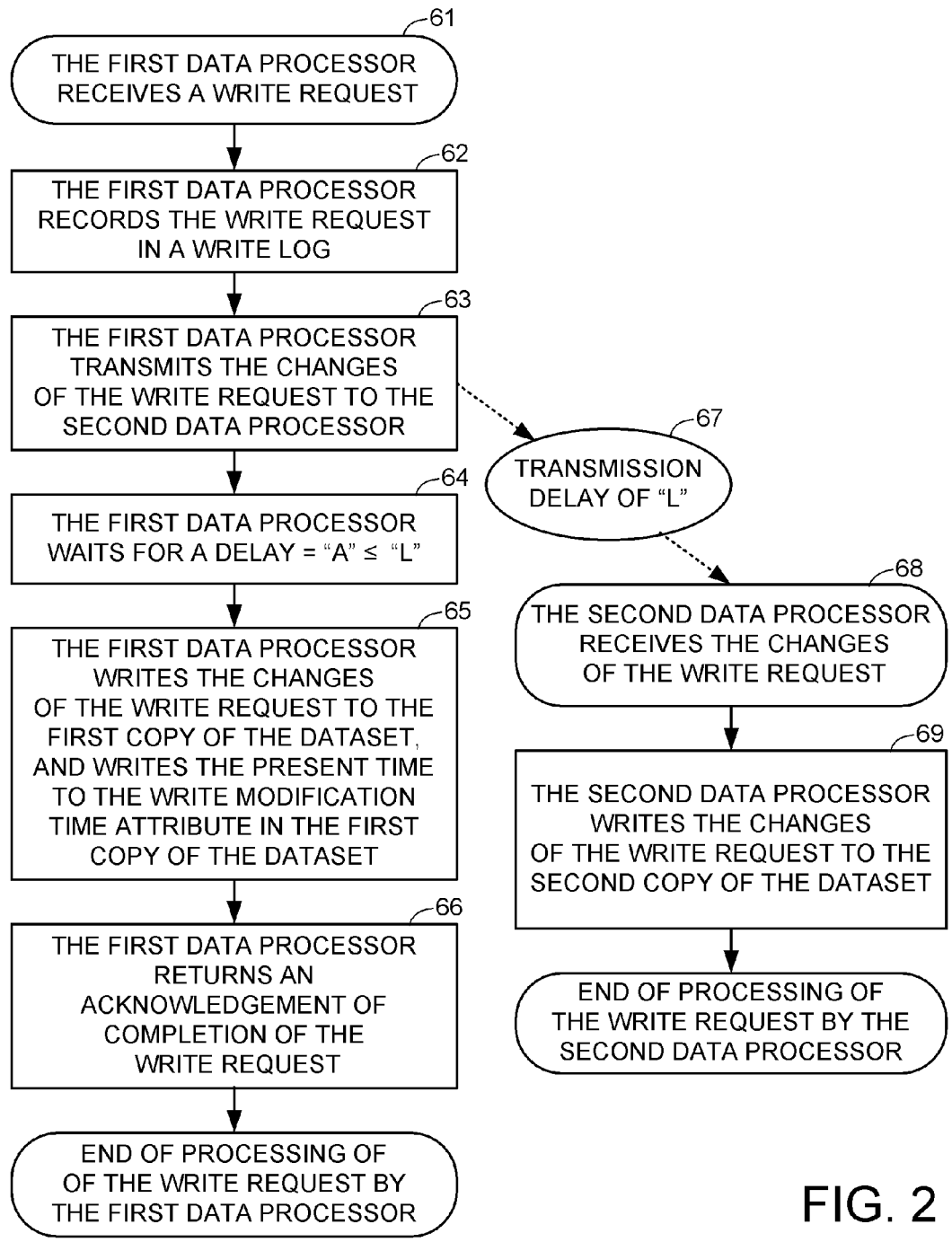
FIG. 2 is a flowchart of a first server computer in FIG. 1 and a second server computer in FIG. 1 responding to a write request from a first client computer in FIG. 1.

FIG. 2 shows a specific way of programming the first server computer (21 in FIG. 1) and the second server computer (23 in FIG. 1) for responding to a write request from the first client computer (22 in FIG. 1). In a first step 61, the first data processor receives the write request. Next, in step 62, the first data processor records the write request in the write log (37 in FIG. 1). Then, in step 63, the first data processor (31 in FIG. 1) transmits the changes of the write request to the second data processor (41 in FIG. 1). Then, in step 64, the first data processor waits for a delay "A" that is less than or equal to the data transmission delay "L". After the delay "A", execution continues to step 65. In step 65, the first data processor writes the changes of the write request to the first copy of the dataset (36 in FIG. 1), and writes the present time to the write modification time attribute (39 in FIG. 1) in the first copy of the dataset. Execution continues from step 65 to step 66. In step 66, the first data processor returns an acknowledgement of completion of the write request to the first client computer.

After step 66, the first data processor has finished processing the write request. However, concurrent with step 64, the changes of the write request are transmitted in step 67 over the data transmission link (25 in FIG. 1) during an interval of time equal to the data transmission delay "L". Then the second data processor receives the changes of the write request in step 68, and the second data processor writes the changes to the second copy of the dataset in step 69. After step 69, the second data processor has finished processing the write request.

Figure 3:
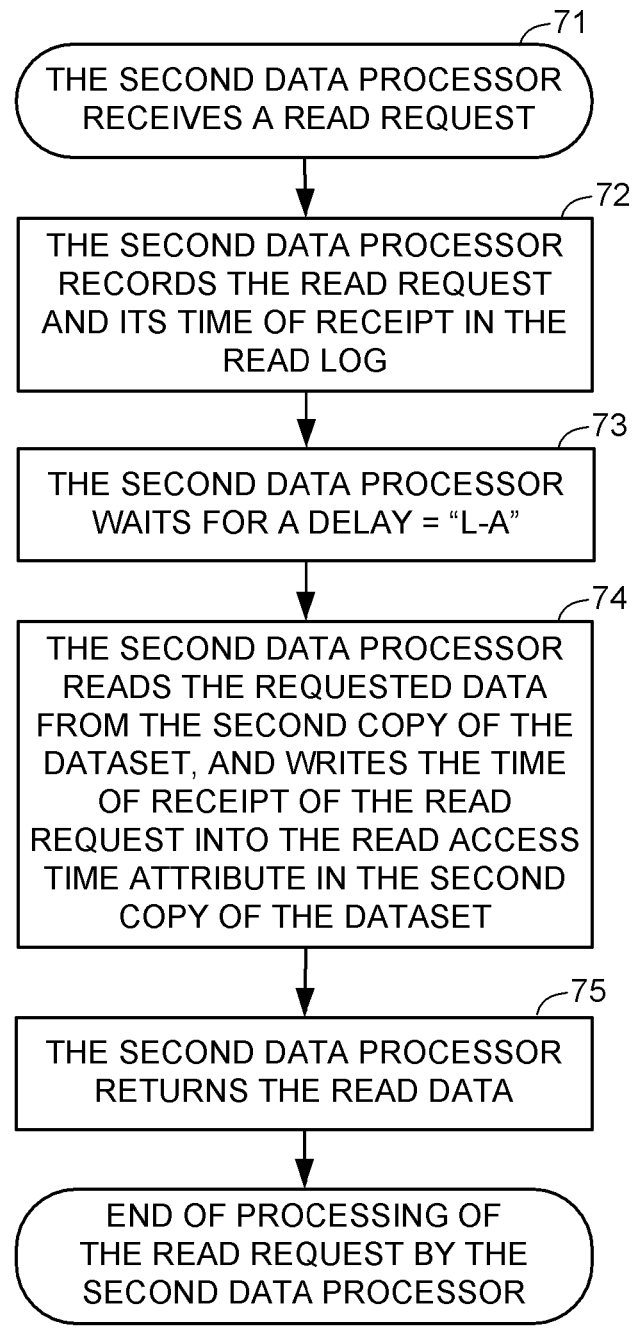
FIG. 3 is a flowchart of the second server computer in FIG. 1 responding to a read request from a second client computer in FIG. 1.

FIG. 3 shows a way of programming the second server computer (23 in FIG. 1) for responding to a read request from the second client computer (24 in FIG. 1). In a first step 71, the second data processor receives the read request from the second client computer. Next, in step 72, the second processor records the read request and its time of receipt in the read log (47 in FIG. 1). Then, in step 73, the second data processor waits for a read delay equal to "L–A". In step 74, the second data processor reads the requested data from the second copy of the dataset, and writes the time of receipt of the read request into the read access time attribute in the second copy of the dataset. In step 75, the second data processor returns the read data to the second client computer. After step 75, the second data processor has finished processing the read request.

For some applications, the second server computer should make the write modification time accessible to the second client computer, and the first server computer should make the read access time accessible to the first client computer. For example, in a distributed file system, the file attributes of each directory and each regular file include a write modification time and a read access time. In this case, step 65 of FIG. 2 would include an operation of transmitting the new write modification time over the data transmission link to the second data processor, and upon receipt the second data processor would write the new write modification time to the second copy of the dataset stored in the second server computer. Also step 74 would include the second data processor sending the new read access time to the first data processor, and upon receipt the first data processor would write the new read access time to the first copy of the dataset stored in the first server computer.

In a system in which writing to the dataset or reading to the dataset may occur at more than one server computer, the new write modification times and the new read access times would be transmitted to the other server computers storing copies of the dataset, and in this case the new write modification times and the new read access times would be received, compared, and merged at each server computer before being written into the local copy of the dataset. For example, at each server computer, the comparing and merging would update the write modification time in the local copy of the dataset only with a new write modification time having a more recent time value than the time value of the write modification time already found in the local copy of the dataset, and the comparing and merging would update the read access time in the local copy of the dataset only with a new read access time having a more recent time value than the time value of the read access time already found in the local copy of the dataset.

Figure 4:
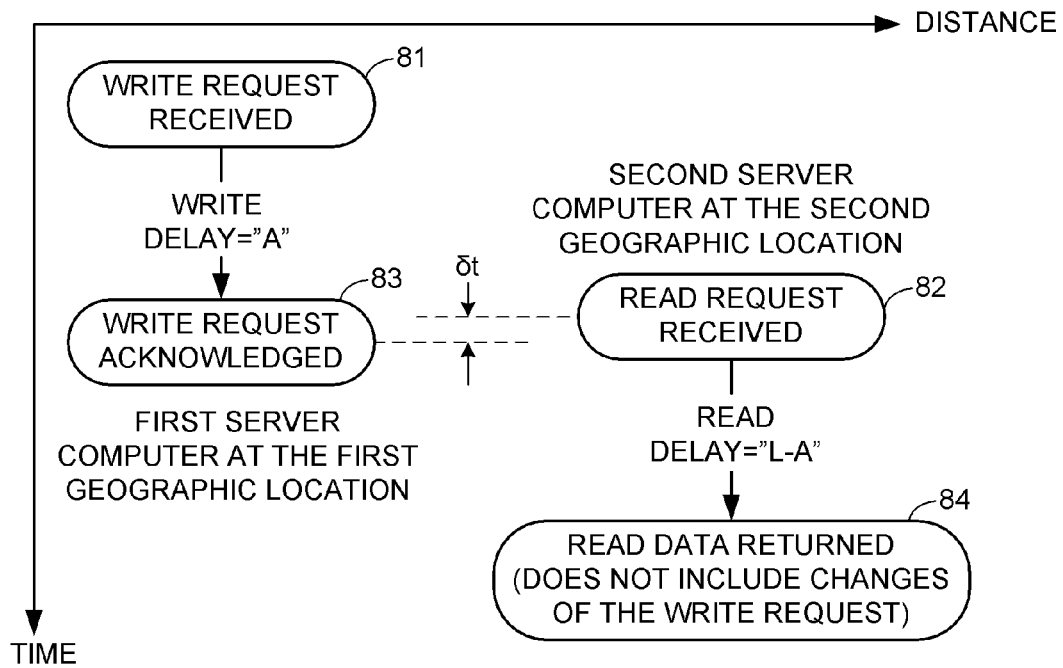
FIG. 4 is a timing diagram showing a way of scheduling a specific relationship between the writing at the first server computer and the reading at the second server computer in the system of FIG. 1 so that when a read request from the second client computer is received at the second server computer before a write request from the first client computer is acknowledged at the first server, the second server computer does not respond to the read request by returning changes of the write request to the second client computer.

FIG. 4 shows a timing diagram for the system of FIG. 1 programmed as shown in FIGS. 2 and 3 for the case where the data transmission delay is evenly split between a write delay of "L/2" and a read delay of "L/2". In this case, a write request is received 81 at the first server computer, and then a read request is received 82 at the second server computer, and then the write request is acknowledged 83 at the first server computer, and then the read data is returned 84 at the second server computer. The write delay of "A" is the interval of time from when the write request is received 81 to when the write request is acknowledged 83. The read delay "L–A" is the interval of time from when the read request is received 82 to when the read data is returned 84. The write request is acknowledged an interval of time $\delta t$ after the read request is received.

Due to the fact that there is a transmission delay of "L" from the first server computer and the second server computer, and the receipt of the read request 82 follows the receipt of the write request by about half of the transmission delay "L", the programming of the first and second server computers determines whether or not the read data returned includes the changes of the write request. For the programming of FIGS. 2 and 3, a comparison of the time when the read request was received to the time when the write request was acknowledged determines whether or not the read data returned includes the changes of the write request. This comparison occurs during the scheduling of the read operation in the second server computer, and more specifically when the reading occurs in step 74 of FIG. 3 after the read delay of "L–A".

In practice, there is a limited precision in the scheduling of the read operation due to skew between the local clock in the first server computer and the local clock in the second server computer, and the resolution of the clocks, but this precision can be made no less than a few microseconds by a comparison of timestamps indicating when the write request was received 81 and when the read request was received 82 after an offset by the write delay "A". Therefore this comparison may result in three outcomes. The first case, as shown in FIG. 4, is the case in which the read request is received before the write request is acknowledged. In this case, the interval of time δt is greater than scheduling precision, so that the read data returned does not include the changes of the write request. The second case is the case in which the interval of time δt is less than the scheduling precision, so that the receipt of the read request is simultaneous with the acknowledgement of the write request at the level of the scheduling precision. In this case of simultaneous requests upon the same data, the resulting read data that is returned (either the "before image" or the "after image") may depend on clock skew. For the less likely event of a comparison of the time stamps resulting in an equality, the program instructions may choose to return either the "before image" or the "after image" of the requested data.

Figure 5:
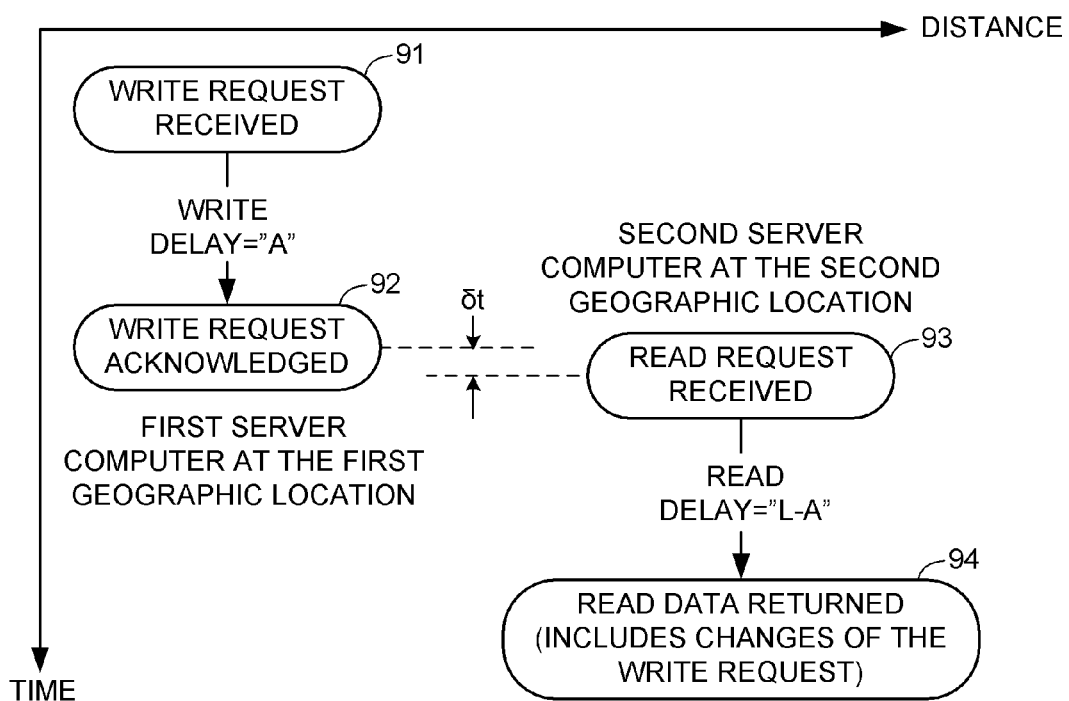
FIG. 5 is a timing diagram showing a way of scheduling a specific relationship between the writing at the first server computer and the reading at the second server computer in the system of FIG. 1 so that when a read request from the second client computer is received at the second server computer after a write request from the first client computer is acknowledged by the first server computer, the second server computer responds to the read request by returning changes of the write request to the second client computer.

FIG. 5 shows the third case in which the read request is received 93 after the write request is acknowledged 92. In this third case, the interval of time δt is greater than the scheduling precision, and the read data returned includes changes of the write request. As before, the write delay "A" is the interval of time from when the write request is received 91 to when the write request is acknowledged 92, and the read delay "L–A" is the interval of time from when read request is received 93 to when the read data is returned.

Figure 6:
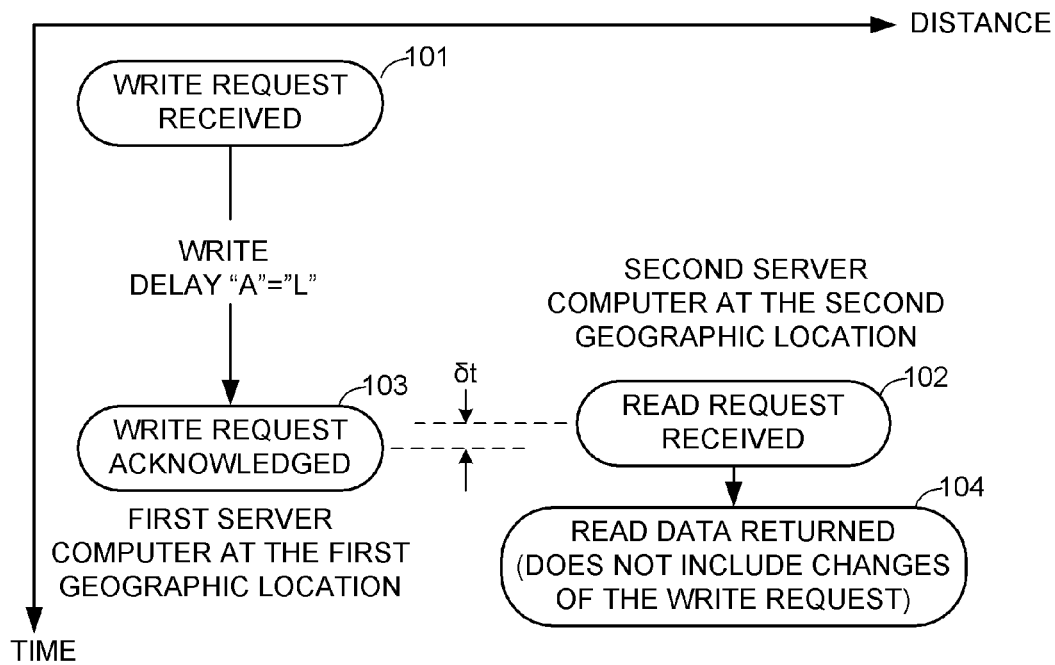
FIG. 6 is a timing diagram for the case in which the second server computer receives a read request from the second client computer before the first server computer acknowledges a write request from the first client computer, and writing is delayed by the transmission delay and the reading is not delayed because reading is always more frequent that writing.

FIG. 6 shows a timing diagram for the case where write access in infrequent and read access is frequent, and a read request is received 102 at the second server computer before a write request is acknowledged 103 at the first server computer so that the read data returned 104 does not include changes of the write request. In this case, the write delay "A" is set equal to the transmission delay "L", and this write delay is the interval of time from when the write request is received 101 at the first computer to the time when the write request is acknowledged 103 as completed at the first server computer. There is no read delay between the time when the read request is received 102 at the second server computer to the time when the read data is returned 104 by the second server computer.

Figure 7:
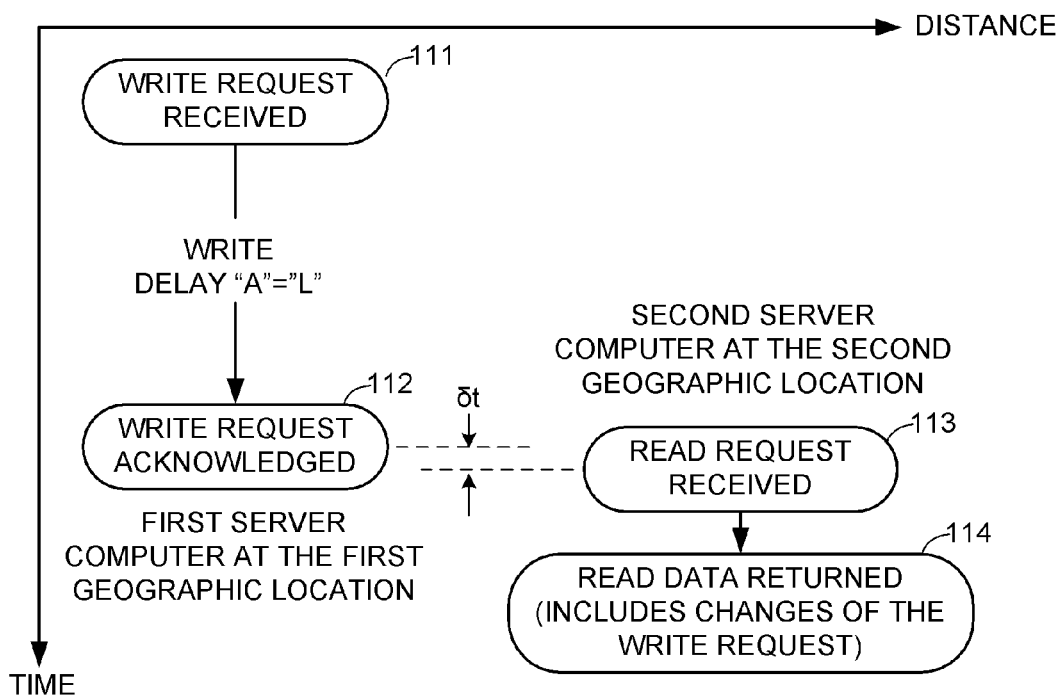
FIG. 7 is a timing diagram for the case in which the second server computer receives a read request from the second client computer after the first server computer acknowledges a write request from the first client computer, and writing is delayed by the transmission delay and the reading is not delayed because reading is always more frequent that writing.

FIG. 7 shows a timing diagram for the case where write access in infrequent and read access is frequent, and a read request is received 113 at the second server computer after a write request is acknowledged 112 as completed at the first server computer so that the read data returned 114 includes changes of the write request. In this case, the write delay "A" is set equal to the transmission delay "L", and this write delay is the interval of time from when the write request is received 111 at the first server computer to the time when the write request is acknowledged 112 as completed at the first server computer. In this case, the read delay is zero. There is no read delay between the time when the read request is received 113 at the second server computer to the time when the read data is returned 114 by the second server computer.

Figure 8:
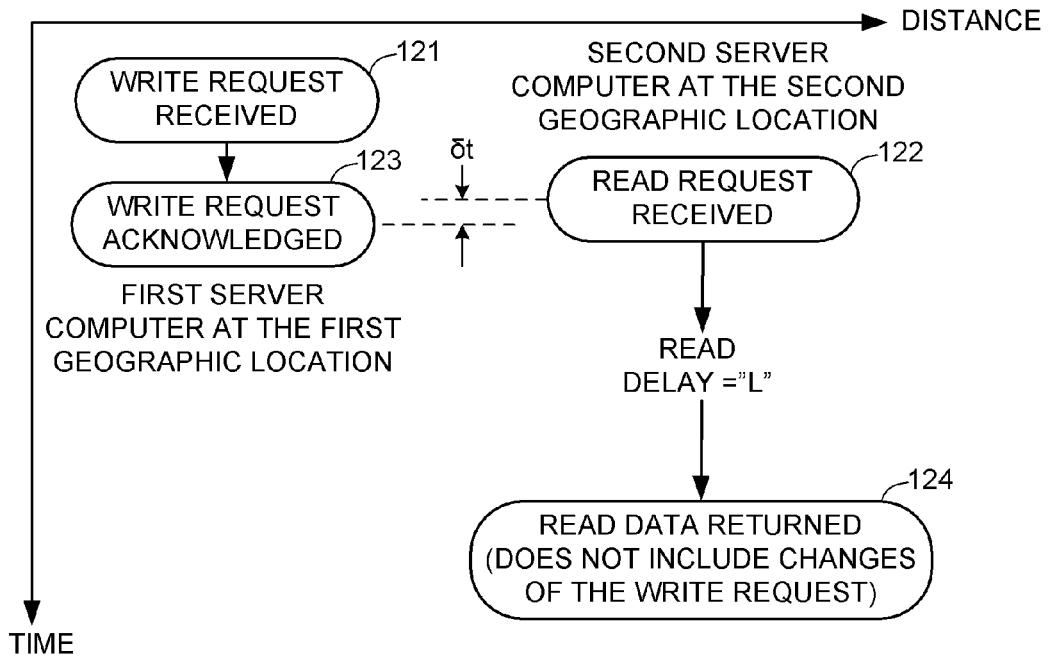
FIG. 8 is a timing diagram for the case in which the second server computer receives a read request from the second client computer before the first server computer acknowledges a write request from the first client computer, and writing is not delayed and reading is delayed by the transmission delay because writing is always more frequent that reading.

FIG. 8 shows a timing diagram for the case where write access in frequent and read access is infrequent, and a read request is received 122 at the second server computer before a write request is acknowledged 123 as completed at the first server computer so that the read data returned 124 does not include changes of the write request. In this case, there is no write delay between the time when the write request is received 121 at the first server computer to the time when the write request is acknowledged 123 as completed at the first server computer. There is a read delay equal to the transmission delay "L", and this read delay is the interval of time from when the read request is received 122 at the second server computer to the time when the read data is returned 124 at the second server computer.

Figure 9:
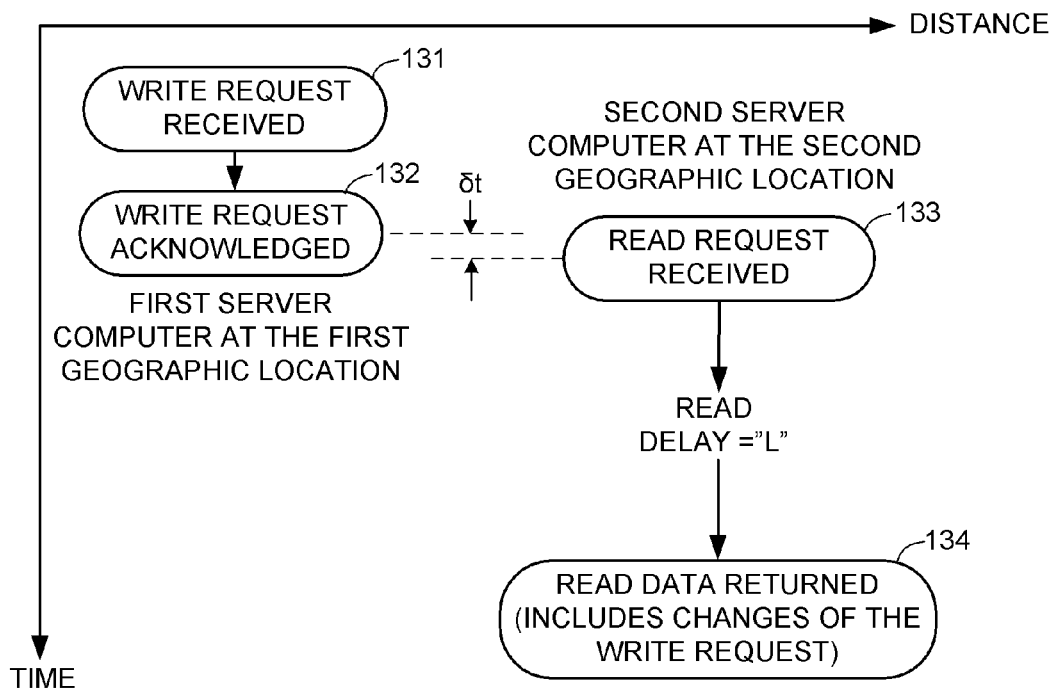
FIG. 9 is a timing diagram for the case in which the second server computer receives a read request from the second client computer after the first server computer acknowledges a write request from the first client computer, and writing is not delayed and the reading is delayed by the transmission delay because writing is always more frequent that reading.

FIG. 9 shows a timing diagram for the case where write access in frequent and read access is infrequent, and a read request is received 133 at the second server computer after a write request is acknowledged 132 as completed at the first server computer so that the read data returned 134 includes changes of the write request. In this case, there is no write delay from the time when the write request is received 131 at the first server computer to the time when the write request is acknowledged 132 as completed at the first server computer. There is a read delay equal to the transmission delay "L", and this read delay is the interval of time from when the read request is received 133 at the second server computer to the time when the read data is returned 134 at the second server computer.

For applications in which there are design choices for the read delay and the write delay in a group of two or more of the server computers, a general goal is to minimize the average latency in the system. This general goal implies that a majority of the delay should occur for processing of the less frequent of the read access or write access. For example, for the most elementary case of a first server computer providing write access to a first client computer local to the first server computer and a second server computer providing read access to a second client computer, there are three distinct possibilities. First, if read access is usually more frequent than write access, then read access should not be delayed and instead write access should be delayed for the transmission delay. Second, if write access is usually more frequent than read access, then write access should not be delayed and instead read access should be delayed for the transmission delay. Third, if read access is just as frequent as write access, then the read delay should be one-half of the transmission delay, and the write delay should also be one-half of the transmission delay. Between these three distinct possibilities there are intermediate possibilities in which the process of minimizing the average latency depends upon statistics of the frequency distribution of read access and write access.

Figure 10:
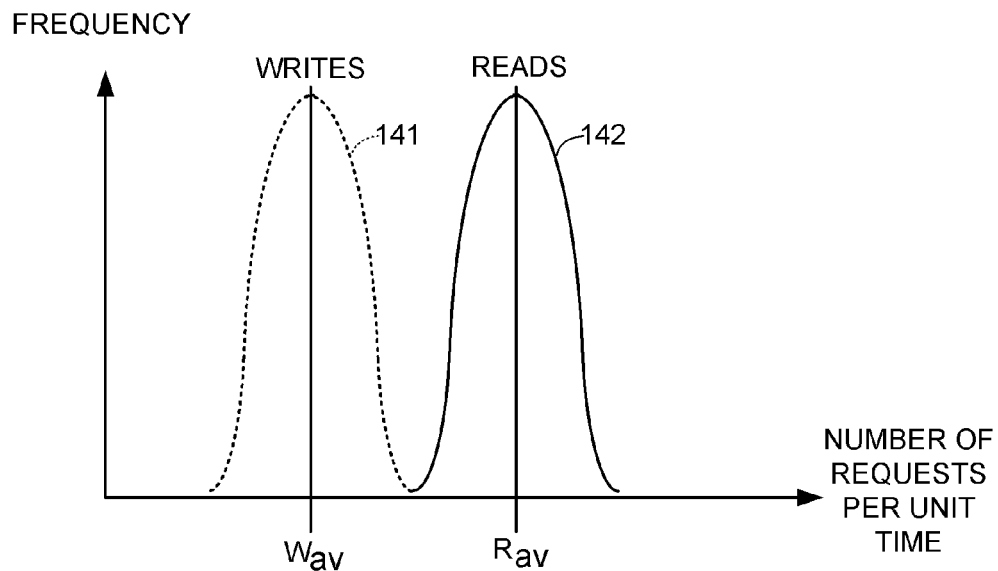
FIG. 10 is a graph showing frequency distributions of read requests and write requests in the system of FIG. 1 for a case in which the read requests are always more frequent than the write requests so that there is no significant overlap between the frequency distribution of the read requests and the frequency distribution of the write requests.

FIG. 10, for example, shows a frequency distribution 141 for write requests to the first server computer, and a frequency distribution 142 for read requests to the second computer. The frequency distribution represents the probability of a server computer receiving a certain number of requests in a unit time interval, such as one second.

In practice, the frequency distribution can be estimated by a histogram created from a series of measurements of the number of requests per unit time interval. The histogram is a bar graph in which the horizontal (abscissa) axis is subdivided into equally spaced intervals called bins, so that each bin corresponds to a bar of the bar graph. For example, the spaced interval of each bin is an integer number of request per unit time, such as one request per unit time. A count is associated with each bin. The count value is the ordinate value of the bar corresponding to each bin. Initially all of the counts are zero.

For each measurement, the result of the measurement is a certain number of requests per unit time interval, and the bin is found corresponding to this certain number of requests, and the count associated with this bin is incremented by one. After the counts have been updated for a relatively large number of measurements, the histogram is a good estimate of the frequency distribution.

For the case of FIG. 10, the read requests upon the dataset are more frequent than the write requests, and there is no significant overlap between the frequency distribution 142 of the read requests and the frequency distribution 141 of the write requests. In this case, to minimize the average latency in the system, the read requests are not delayed, and the write requests are delayed by the transmission delay "L". In a similar fashion, if the write requests upon the dataset are more frequent than the read requests, and there is no significant overlap between the frequency distribution of the read requests and the frequency distribution of the write requests, then to minimize the average latency in the system, the write requests are not delayed, and the read requests are delayed by the transmission delay "L".

Figure 11:
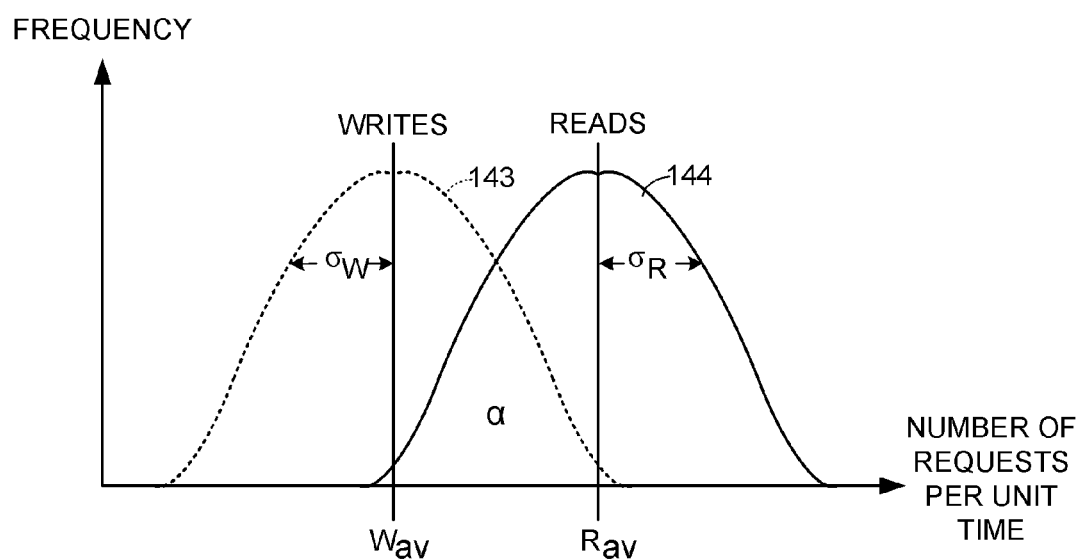
FIG. 11 is a graph showing frequency distributions of read requests and write requests in the system of FIG. 1 for a case in which the read requests are usually more frequent than the write requests but there is significant overlap between the frequency distribution of the read requests and the frequency distribution of the write requests so that sometimes the write requests appear to be more frequent than the read requests.

FIG. 11 shows a case where there is significant overlap "α" between the frequency distribution 143 of the write requests and the frequency distribution 144 of the read requests. FIG. 11 also shows frequency distributions approximating normal distributions. In this case there is very significant overlap when the difference between the average read frequency (Rav) and the average write frequency (Wav) is less than the sum of the standard deviation ($\sigma_W$) of the number of write requests per unit time and the standard deviation ($\sigma_R$) of the number of read requests per unit time. "α" is normalized so that it has a value of "1" for 100% overlap. For example, 100% overlap occurs for the case in which the frequency distribution of the reads is the same as the frequency distribution of writes. Then the overlap "α" can be used to interpolate between the case of no overlap, and the case of 100% overlap.

For example, when histograms are created, the normalized overlap "α" is an accumulation of the minimum count of either the count for reads or the count for writes in each bin, divided by the total number of units of time over which measurements were compiled into the histogram. The total number of units of time over which measurements were compiled into the histogram is the total area under the histogram for the reads. The total number of units of time over which measurements were compiled into the histogram is also the total area under the histogram for the writes.

A way of estimating the "α" is to assume that each histogram is a normal distribution, and to compute the average frequency of reads per unit time, the standard deviation of the reads per unit time, the average frequency of write per unit time, and the standard deviation of reads per unit time, from the measurements of the number of reads per unit time and the number of writes per unit time. Then the abscissa "x" of the point of overlap on the normal function $((1/\sqrt{2\pi})\exp(-x^2/2))$ is estimated as $x=(\beta Rav-Wav|)/(\sigma_R+\sigma_W)$, and the estimate of the overlap "α" is obtained as the sum of the area under the normal function from $-\infty$ to $-x$ and from $+x$ to $+\infty$. For example, FIG. 7 shows the case for x=1, and reference to a table of the probability function for the normal distribution gives α=0.3174 for x=1.

If there is no overlap (α=0), then the write delay "A" is either zero (if writes are more frequent than reads), or the write delay "A" is "L" (if reads are more frequent than writes). For 100% overlap (α=1), then the write delay "A" is "½ L". For all these cases, the read delay is "L-A".

Figure 12:
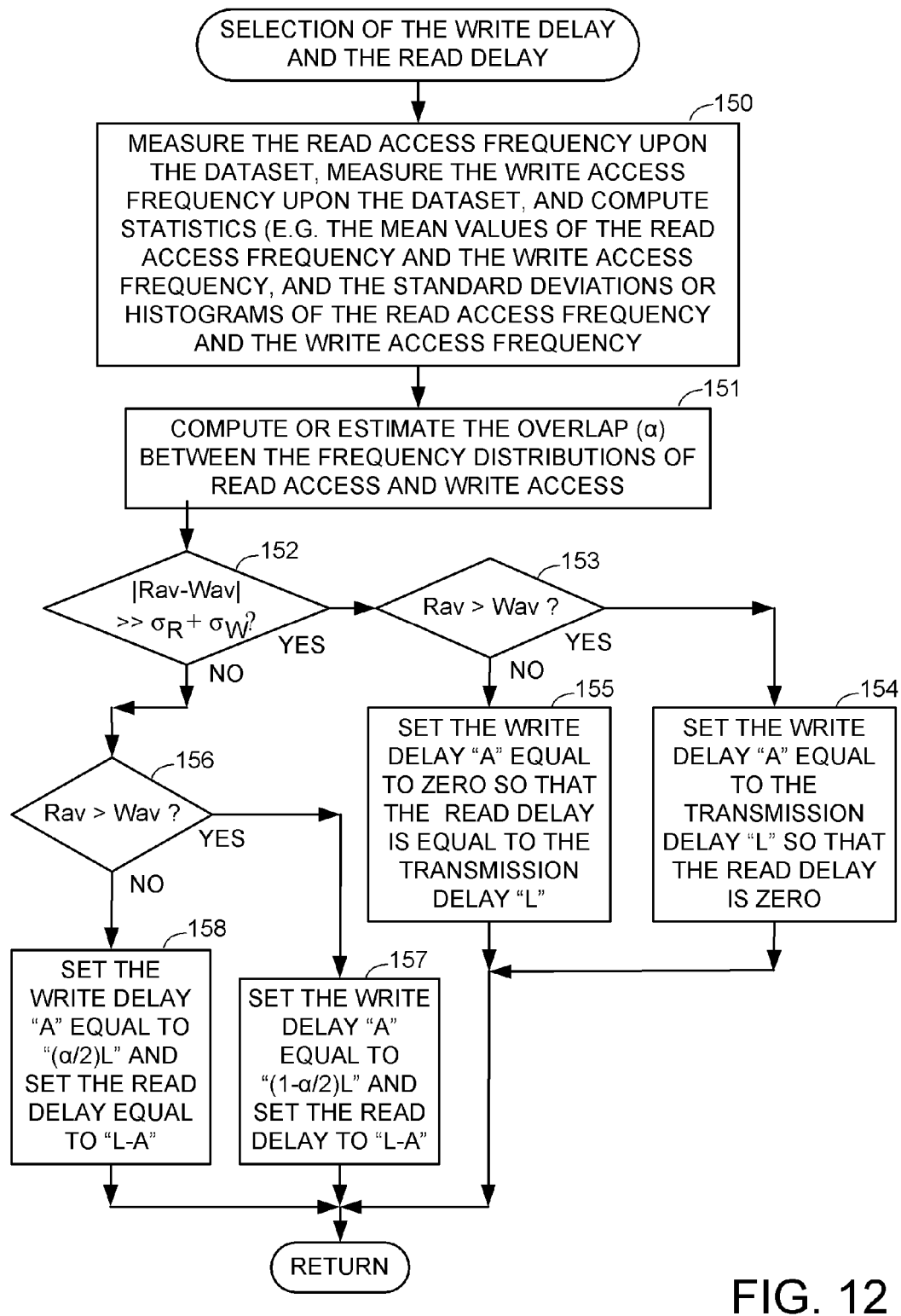
FIG. 12 is a flowchart of a specific way of selecting the read delay and the write delay in the system of FIG. 1.

FIG. 12 shows a specific way of using the overlap "α" to interpolate between the cases for α=0 and α=1 when selecting the write delay and the read delay. In a first step 150, the read access frequency and the write access frequency upon the dataset are measured, and statistics are computed from these measurements, such as the mean values of the read access frequency and the write access frequency, and the standard deviations or histograms of the read access frequency and the write access frequency.

Next, in step 151, the overlap (α) between the frequency distributions of the read access and the write access are computed or estimated, as described above. Then, in step 152, the magnitude of the difference between the average value of the read access frequency and the average value of the write access frequency is compared to the sum of the standard deviation of the read access frequency and the standard deviation of the write access frequency. If the magnitude of the difference between the average value of the read access frequency and the average value of the write access frequency is much greater (e.g., at least three times) the sum of the standard deviation of the read access frequency and the standard deviation of the write access frequency, then execution branches from step 152 to 153. In this case, there is no significant overlap between the frequency distribution of the read requests and the frequency distribution of the write requests.

In step 153, if the average read access frequency (Rav) is greater than the average write access frequency (Wav), then execution branches to step 154. In step 154, the write delay "A" is set equal to the transmission delay "L" so that the read delay is zero. After step 154, execution returns. In step 153, if the average read access frequency (Rav) is not greater than the average write access frequency (Wav), then execution continues to step 155. In step 155, the write delay "A" is set equal to zero, and the read delay is set equal to the transmission delay "L". After step 155, execution returns.

In step 152, if the magnitude of the difference between the average value of the read access frequency and the average value of the write access frequency is not much greater (e.g., not at least three times) than the sum of the standard deviation of the read access frequency and the standard deviation of the write access frequency, then execution branches from step 152 to 156. In this case, there is significant overlap between the frequency distribution of the read requests and the frequency distribution of the write requests. In step 156, if the average read access frequency (Rav) is greater than the average write access frequency (Wav), then execution branches to step 157. In step 157, the write delay "A" is set equal to "1-(α/2)L", where "α" is the overlap and "L" is the transmission delay, and the read delay is set to "L-A". After step 157, execution returns. In step 156, if the average read access frequency (Rav) is not greater than the average write access frequency (Wav), then execution continues to step 158. In step 158, the write delay "A" is set equal to "(α/2)L", where "α" is the overlap and "L" is the transmission delay, and the read delay is set to "L-A". After step 156, execution returns.

For applications for which it is appropriate to split the transmission delay between the read delay and the write delay, if there are substantial variations in the read access frequency or write access frequency or their statistics over time, then it is desirable to dynamically adjust the read delay and the write delay in response to periodic measurement of the read access frequency and the write access frequency. The periodic measurements can be done at each server computer providing read or write access to the dataset.

Figure 14:
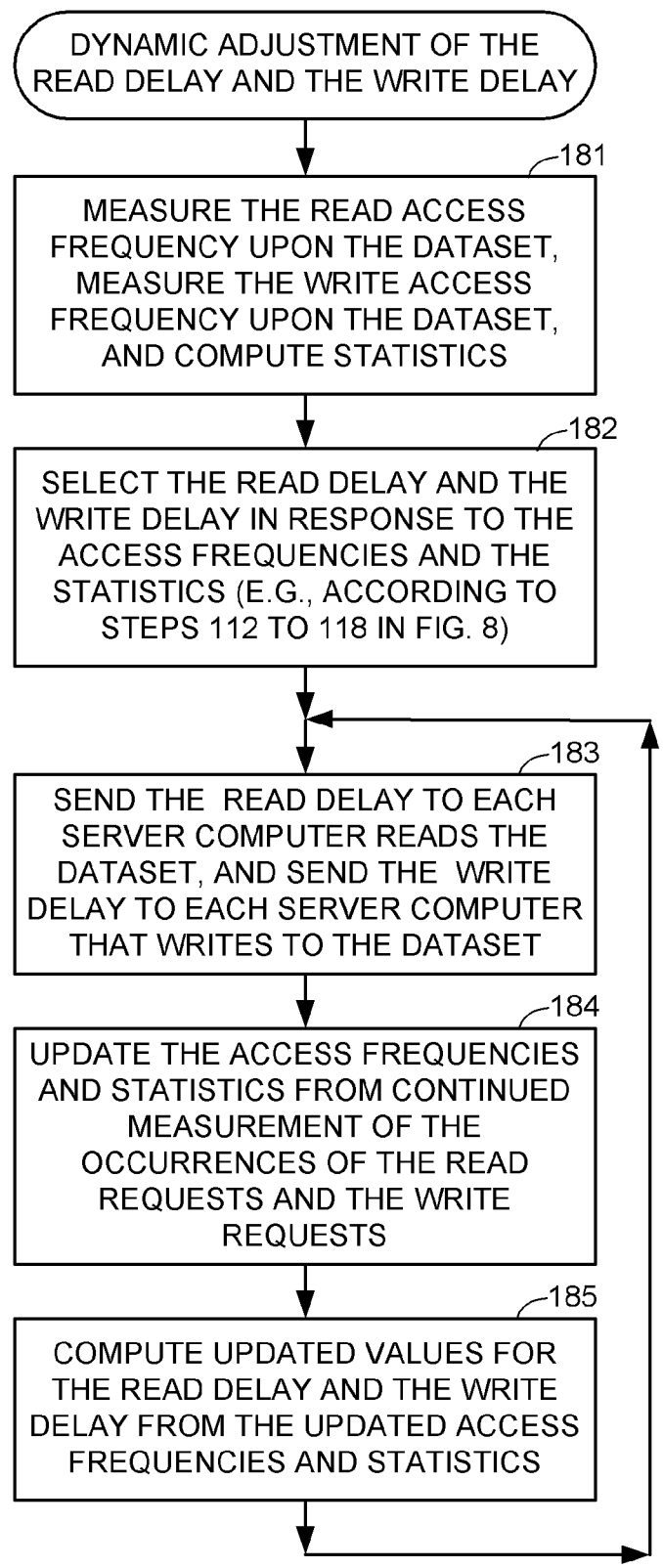
FIG. 14 is a flowchart of a method of dynamic adjustment of the read delay and the write delay in response to measurements of the read access frequency and the write access frequency.

FIG. 14, for example, shows five server computers 161, 162, 163, 164, 165 for providing access to a dataset, and each server computer executes a respective copy 171, 172, 173, 174, 175 of a program that measures the read access rate and the write access rate at the server computer. A central one of the server computers 161 executes a program for adjusting the read delay and the write delay in response to the measured read access frequencies and the measured write access frequencies. For example, the central server computer 161 periodically receives the measurements from each of the other server computers and from the execution of its own measurement program 171, and then computes the read delay and the write delay as described above with respect to FIG. 12, and then sends the computed read delay and the write delay to the other server computers.

FIG. 14 shows further details of the method of dynamically adjusting the read delay and the write delay. In a first step 181, the read access frequency upon the dataset is measured, and the write access frequency upon the dataset is measured, and statistics are computed from the measured read access frequency and the measured write access frequency. For example, execution of the program for measuring the read access rate and the write access rate at each server computer maintains a running count of the read requests received, and a running count of the write requests received. Periodically these running counts are reported to the execution of the program for adjusting the read delay and the write delay. The execution of the program for adjusting the read delay and the write delay computes the read access frequency at each server computer as the difference in each running read request count from the server over the reporting period, and computes the write access frequency at each server computer as the difference in each running write count from each server computer over the reporting period. Then the execution of the program for adjusting the read delay and the write delay computes average values and statistics of the read access frequency and the write access frequency, for example as discussed above with respect to FIG. 11 and steps 150 and 151 in FIG. 12.

Next, in step 182, the execution of the program for adjusting the read delay and the write delay selects the read delay and the write delay in response to the read access frequency and the write access frequency and the statistics, for example as discussed above with respect to steps 152 to 158 in FIG. 12. Then, in step 183, the read delay is sent to each of the server computers that read from the dataset, and the write delay is sent to each of the server computers that write to the dataset.

In step 184, the access frequencies and statistics are updated from continued measurement of the occurrences of the read requests and the write requests. The updated average read access frequency, the updated average write access frequency, and the updated statistics, for example, are computed as running averages or statistics of measurements over multiple reporting periods. In step 185, updated values for the read delay and write delay are computed from the updated access frequencies and statistics. Execution then loops back to step 183 to dynamically update the read delay and the write delay.

Because the updated access frequencies in step 184 take into consideration measurements over multiple reporting periods, updated values for the read delay and the write delay should change by no more than a few percent for each loop through steps 163, 164, and 165. In any event, in a preferred implementation, a system is started and maintained in such a way that the read delay and the write delay sent to the server computers storing a dataset will change by no more than a few percent for each loop through steps 163, 164, and 165 once read access and write access to the dataset is enabled. In addition, these changes to the read delay and the write delay are made effective at the server computers in such a way that the sum of any write delay and any read delay for any dataset change transmitted between two server computers storing the dataset is no less than the transmission delay "L" between the server computers.

Figure 13:
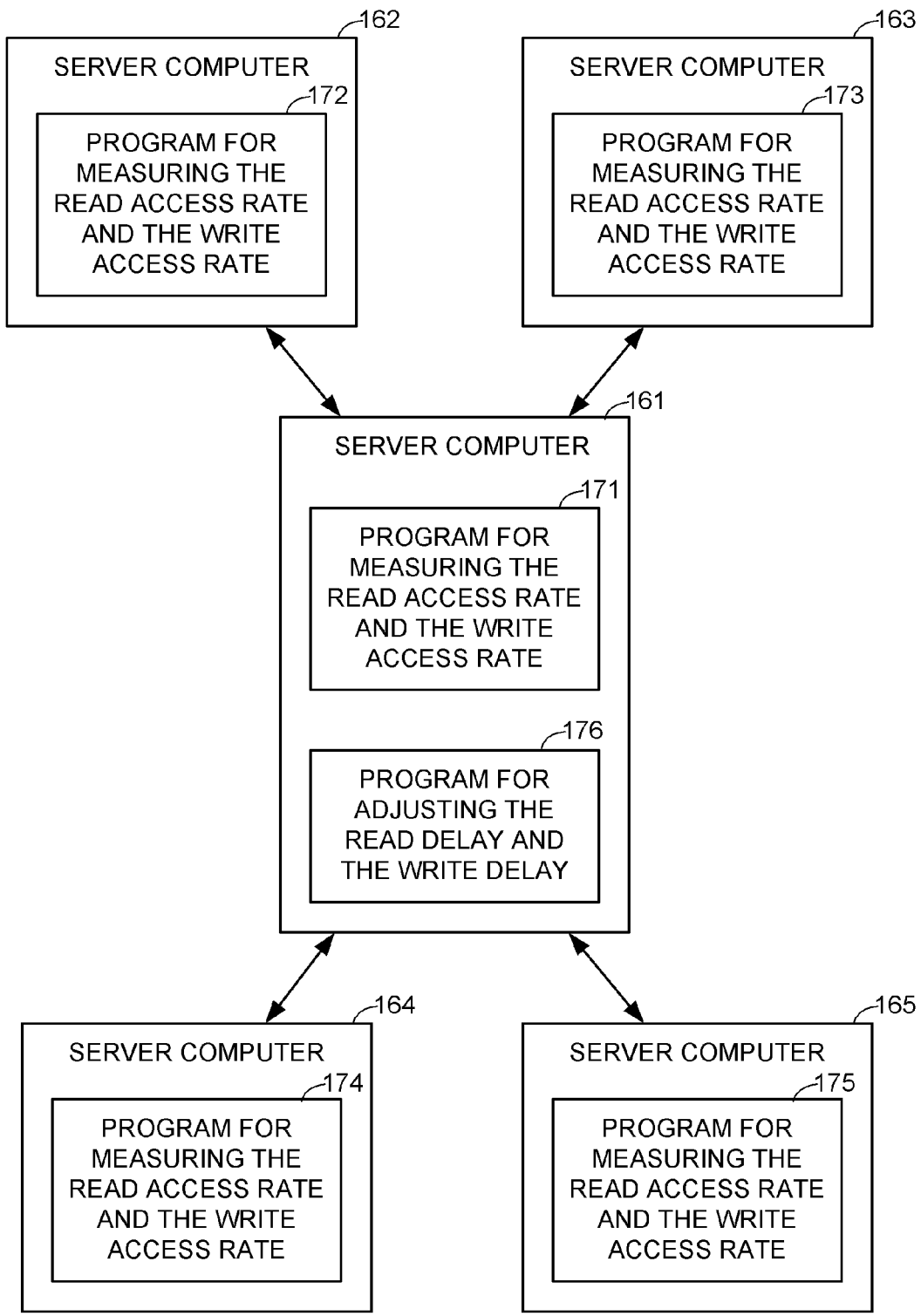
FIG. 13 is a block diagram showing a network of multiple server computers in which a central server computer functions as a delay controller by adjusting the read delay and the write delay in response to measurements of the read access rate and the write access rate at the multiple server computers.

For example, the central server computer (161 in FIG. 13) sends any increase in the write delay or the read delay in advance of any decrease in the write delay or the read delay. In particular, if the delay update calls for increasing the write delay by 1% and decreasing the read delay by 1%, then the central server computer sends the increased write delay to the other server computers that write data to the dataset, and then waits for a duration of time equal to the transmission delay "L", and then sends the decreased read delay to the other server computers that read data from the dataset. If the delay update calls for decreasing the write delay by 1% and increasing the read delay by 1%, then the central server computer sends the increased read delay to the other server computers that read data from the dataset, and then waits for a duration of time equal to the transmission delay "L", and then sends the decreased write delay to the other server computers that write data to the dataset. In this fashion, a delay update may temporarily increase the sum of the read delay and the write delay for the processing of a concurrent write operation so that the sum is greater than the transmission delay "L" by a few percent for a short time, but a delay update will not decrease the sum of the read delay and the write delay to less than the transmission delay "L" for the processing of a concurrent write operation.

A specific application may have a particular environment or objective that may influence the most desirable way of dividing the transmission delay between the write delay and the read delay. For example, if the write delay is the transmission delay "L", then it is possible for a read-only server computer to forward a write request from an originating client computer to a read-write server computer and then the read-write server computer may process this forwarded write request without delay and then return an acknowledgement of completion of this write request to the forwarding read-only server computer. In this case the dataset will appear to change when the forwarding read-only server computer returns the acknowledgement of completion to the originating client computer, so that the server computers provide a global view of the dataset that is up-to-date for forwarded write requests as well as for write requests that the read-write server computer receives from client computers local to the read-write server computer. For an application where this is a desired objective, one is biased toward selecting a write delay. A specific example is shown in FIG. 15.

Figure 15:
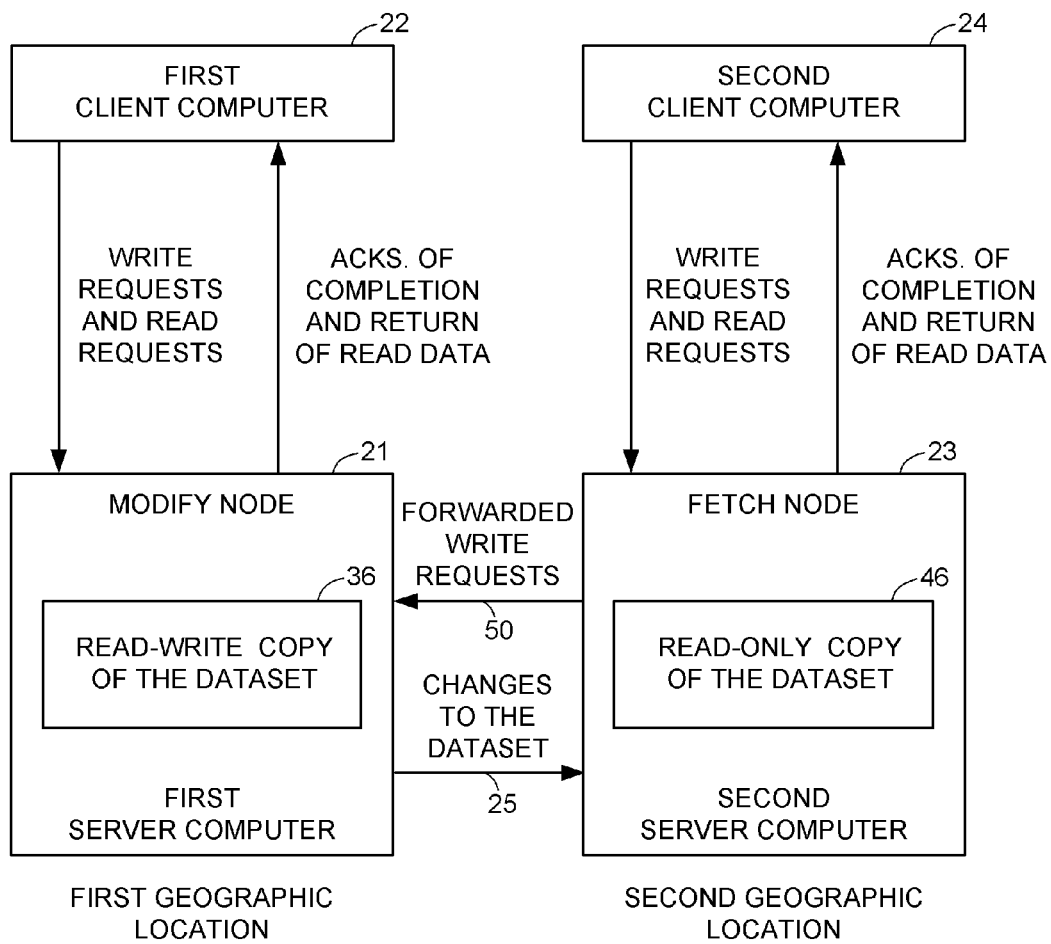
FIG. 15 is a block diagram showing a specific implementation of the system of FIG. 1 in which the first server computer stores a read-write copy of the dataset, the second server computer stores a read-only copy of the dataset, and the second server computer forwards write requests to the first server computer.

FIG. 15 more specifically shows an implementation of the system of FIG. 1 in which the first copy 36 of the dataset is a read-write copy of the dataset, and the second copy 46 of the dataset is a read-only copy of the dataset. In this case the first server computer 21 functions as a modify node in the system to provide read-write access to the dataset, and the second server computer 23 functions a fetch node to provide read-only access to the read-only copy of the dataset.

The second server computer 23 also forwards each write request from the second client computer 24 to the first server computer 21. The forwarded write requests are transmitted from the second server computer 23 to the first server computer 21 over a data transmission link 50 that parallels the data transmission link 25. The first server computer returns the acknowledgement of completion of each forwarded write request to the second server computer over the data transmission link 25. The second server computer returns the acknowledgement of completion of each forwarded write request to the second client computer 24.

Figure 16:
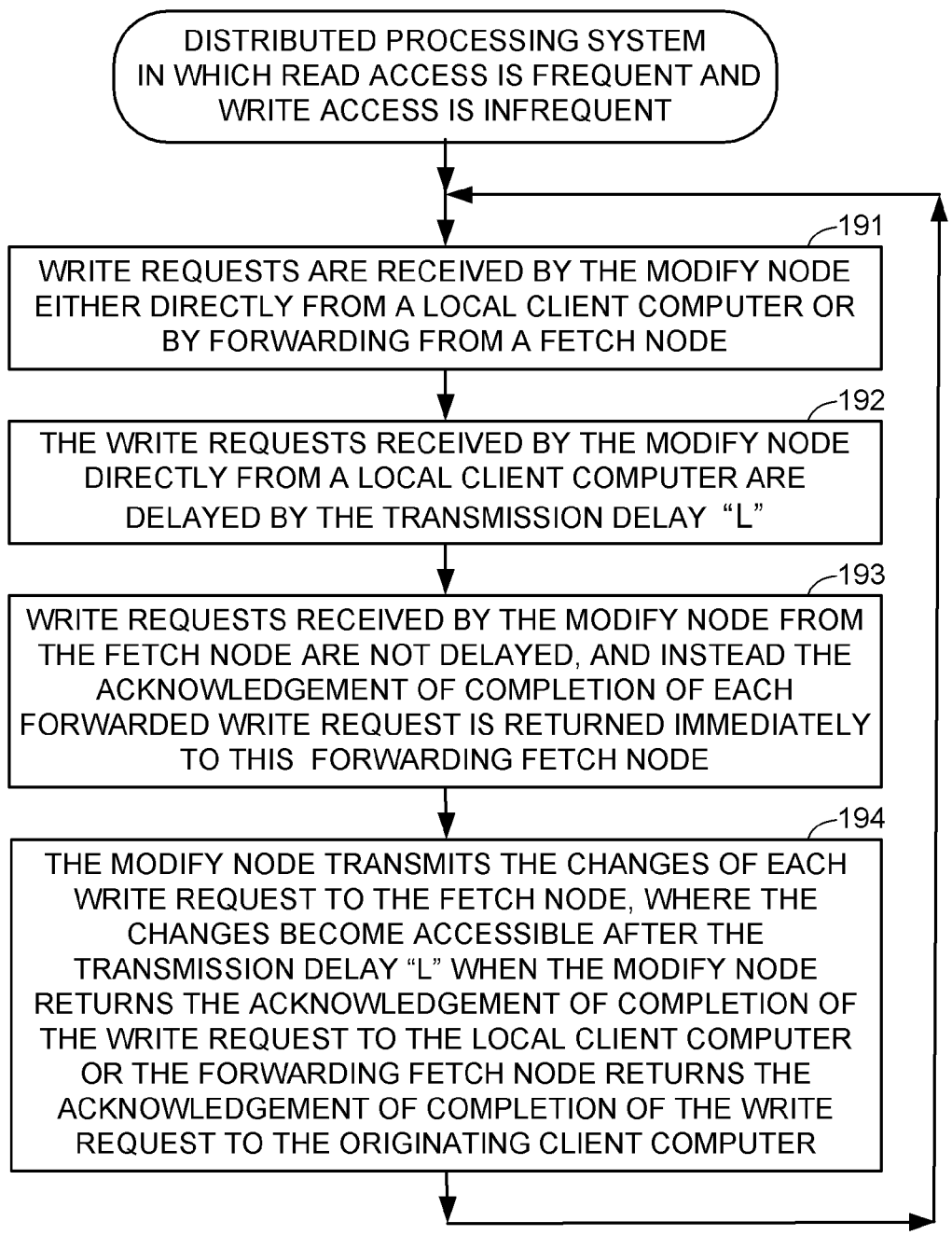
FIG. 16 is a flowchart of a method of processing read and write requests in the system of FIG. 15 for the case in which read access is frequent and write access is infrequent.

FIG. 16 shows the method of operation of the modify node in the system of FIG. 15 for the case in which read access is frequent and write access is infrequent. In a first step 191, write requests are received by the modify node either directly from a local client computer or indirectly by forwarding from a fetch node. Next, in step 192, the local write requests received directly from a local client computer are delayed by the transmission delay "L". In step 193, the forwarded write requests received from the fetch node are not delayed, and instead the acknowledgement of completion of each forwarded write request is returned immediately to the forwarding fetch node. In step 194, the modify node transmits the changes of each write request to the fetch node, where the changes become accessible after the transmission delay "L". In this fashion, the changes of each local write request become accessible at the fetch node when the modify node transmits the acknowledgement of completion of the local write request to the local client computer, and the changes of each forwarded write request become accessible at the fetch node when the forwarding fetch node returns the acknowledgement of completion of the forwarded write request to the originating client computer.

Figure 17:
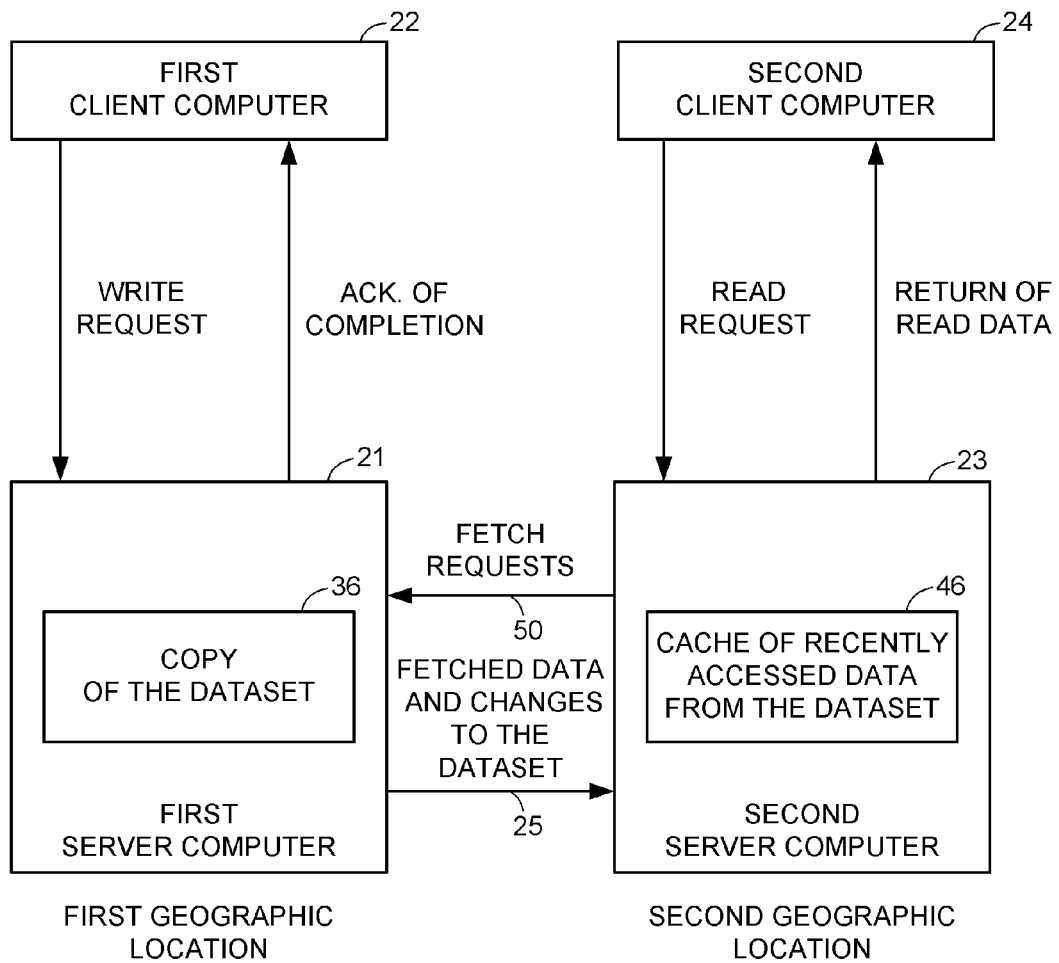
FIG. 17 is a block diagram showing a specific implementation of the system of FIG. 1 in which the first server computer stores a read-write copy of the dataset, the second server computer stores a cache of recently accessed data from the dataset, and the second server computer forwards write requests to the first server computer.

FIG. 17 more specifically shows an implementation of the system of FIG. 1 in which the first copy 36 of the dataset is a read-write copy of the dataset, and the second copy 46 of the dataset is a local cache of recently accessed data from the dataset. In this case, the second server computer 23 responds to a read request from the second client computer 24 by accessing the cache 46. If the requested data is found in the cache 46, then the requested data is read from the cache 46, and returned to the second client computer 24. If the requested data does not reside in the cache 46, then the requested data is fetched from the first server computer 21, stored in the cache 46, and returned to the second client computer 24. Fetch requests are transmitted over the data transmission link 50 from the second server computer 23 to the first server computer 21. In response to the fetch requests, the first server computer 21 returns the fetched data over the data transmission link 25 from the first server computer 21 to the second server computer 23.

In a preferred implementation of organizing the second copy of the dataset 46 as a cache, when the first server computer 21 receives such a fetch request, then the first server computer not only returns the fetched data to the second server computer 23 but also automatically begins a process of transmitting any changes later made to this data in the first copy of the dataset 36. This process of sending later-made changes is continued until this process is terminated by the first server computer 21 or the second server computer 23. For example, the first server computer 21 terminates the process by returning an invalidation request to the second server computer 23. When the process of sending later-made changes is terminated, the second server computer 23 invalidates the fetched data in the cache.

Figure 18:
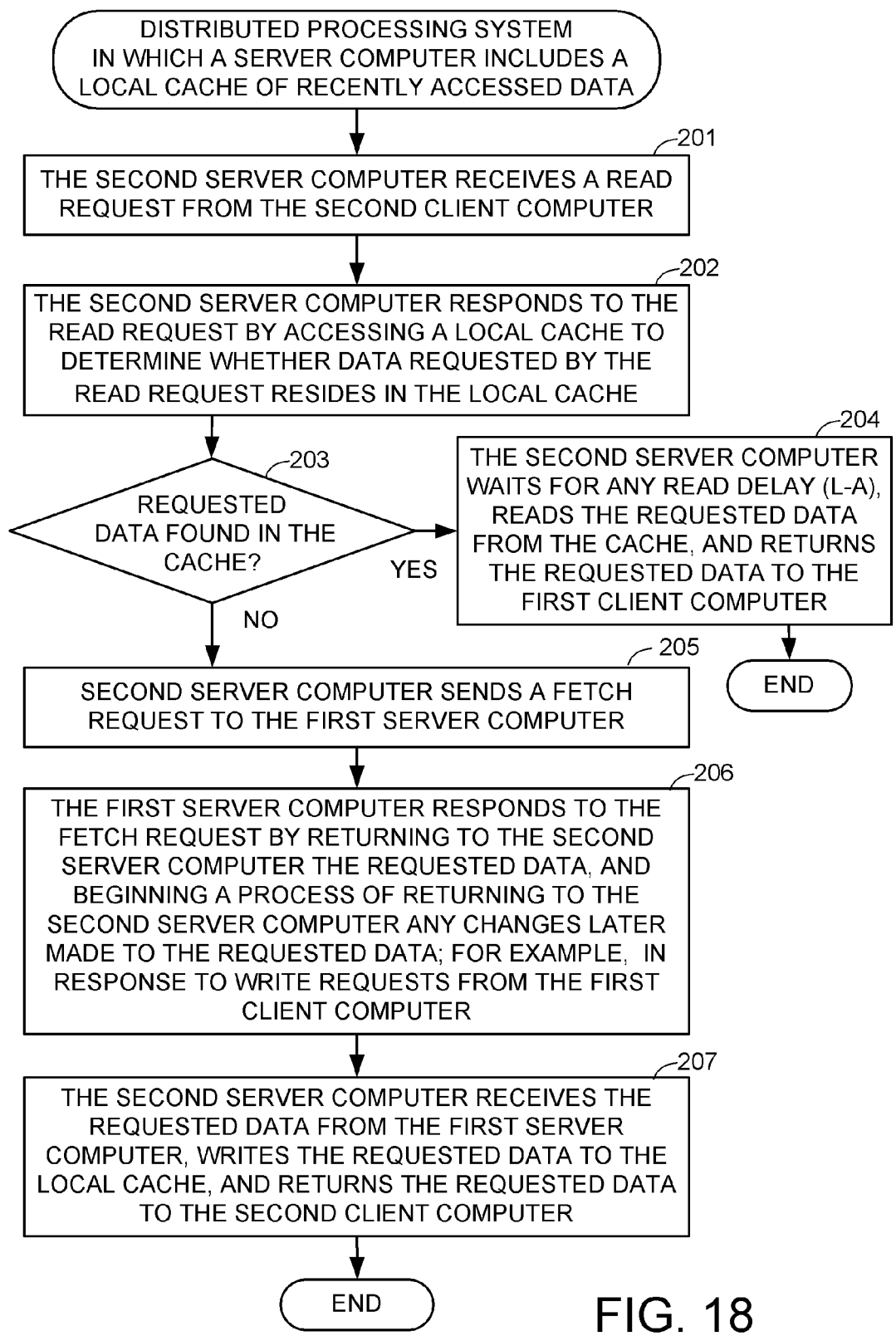
FIG. 18 is a flowchart of a method of processing a read request from the second client computer in the in the system of FIG. 17.

FIG. 18 shows a specific method used in the system of FIG. 17. In a first step 201 of FIG. 18, the second server computer receives a read request from the second client computer 24. In step 202, the second server computer responds to the read request by accessing a local cache to determine whether data requested by the read request resides in the local cache. In step 203, if the requested data is found in the cache, then program execution in the second server computer branches to step 204. In step 204, the second server computer waits for any read delay (L−A), and then reads the requested data from the cache, and returns the requested data to the first client computer. After step 204, processing of the read request from the second client computer is finished.

In step 203, if the requested data is not found in the cache, then program execution in the second server computer continues to step 205. In step 205, the second server computer sends a fetch request to the first server computer. In step 206, the first server computer responds to the fetch request by reading the requested data from its copy of the dataset and returning the requested data to the second server computer. The first server computer also begins a process of transmitting to the second server computer any changes later made to the requested data; for example, changes made in response to write requests from the first client computer. This process of sending later made changes is continued until this process is terminated by the first server computer 21 or the second server computer. Finally, in step 207, the second server computer receives the requested data from the first server computer, writes the requested data to the local cache, and returns the requested data to the second client computer. After step 207, processing of the read request from the second client computer is finished.

For the programming in FIG. 18, for the case of a "cache miss" when the requested data is not found in the cache, there is an added round trip delay of "2L" for fetching the requested data between the time when the read request is received in step 201 and the time when the requested read data is returned to the second client computer in step 207. In this case the returned read data may not be up-to-date as of the time that the read request is received in step 201. Client applications expecting data that is up-to-date as of the time that the read request is received in step 201 could detect this "cache miss" case by detecting the added round-trip delay of "2L" between the time when the request is sent to the second server computer and the time when the requested read data is received from the second server computer. In addition, the second server computer could return a request completion code in step 207 indicating that the read data is the result of a cache miss, and the client application could inspect this request completion code if the client application would need the read data to be up-to-date as of the time that the read request was received by the second server computer.

In a geographically distributed data processing system that includes a central modify node and multiple fetch nodes each spaced by an equal distance from the central node so that the transmission delay "L" is the same from the central modify node to each of the fetch nodes, then the central modify node and each of the fetch nodes may function as described above with respect to FIGS. 15-16. If a fetch node has a local cache, then the fetch node may further function as described above with respect to FIGS. 17 and 18. If the fetch nodes have substantially different data transmission delays from the central modify node, then the transmission delay of most significance is the maximum data transmission delay, because the larger transmission delays have greater undesirable effects on an application that is sensitive to the transmission delay. In general, the significance of this maximum data transmission delay depends on the application and the users of the application. For some applications and some users, it may be desired for the system to be programmed to compensate for the transmission delay to each fetch node in such a way that the latency is a minimum at each node and the system operates with an acceptable level of performance at each node. In this case, the performance at the fetch node having the maximum transmission delay may be acceptable but the performance at the fetch node having the minimum transmission delay may be better due to lower latency. For other applications or users, it may be desired to program the system to have equal performance at all nodes.

Figure 19:
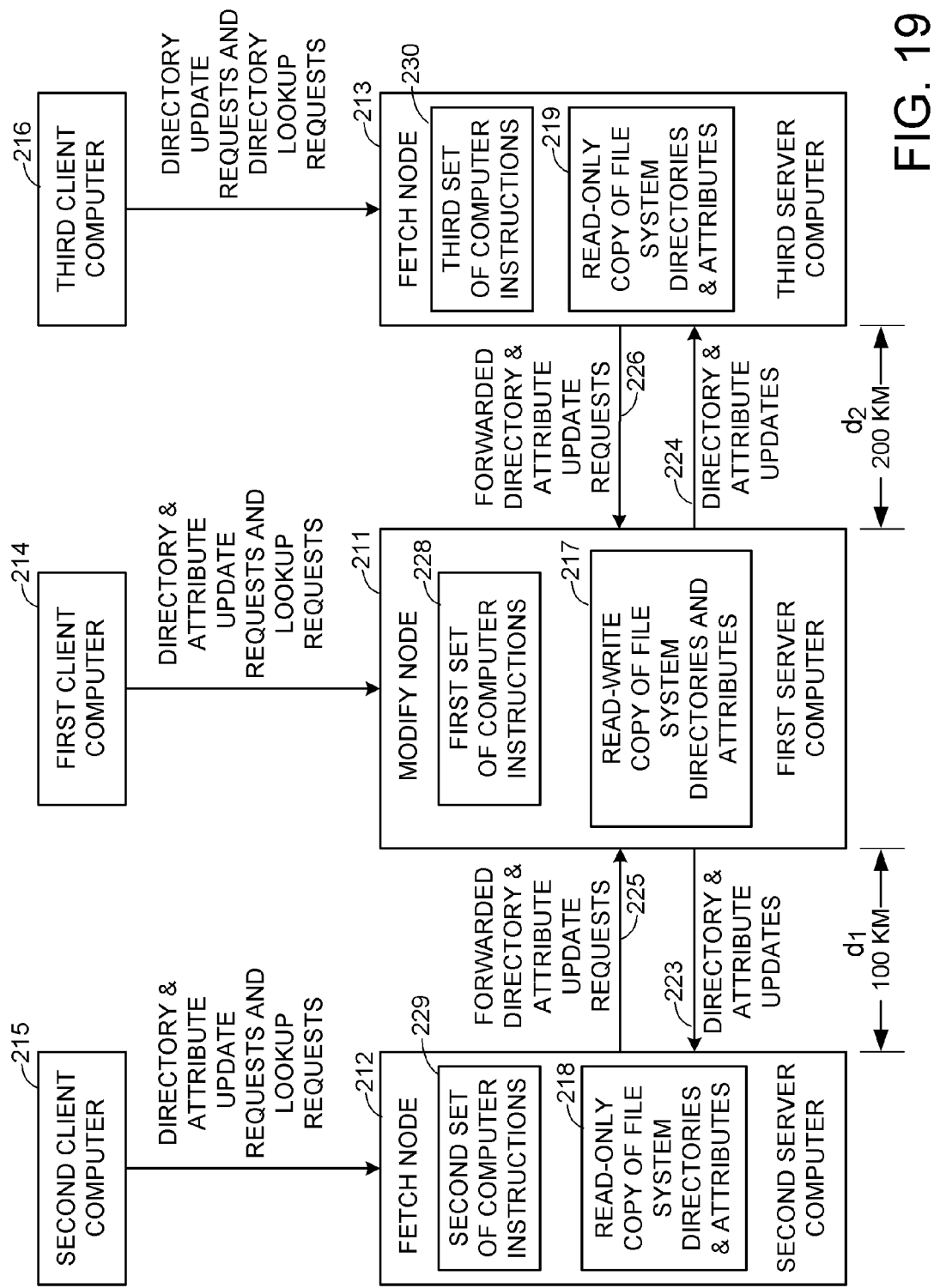
FIG. 19 is a block diagram showing three physically-spaced server computers in a geographically distributed file server system, in which one server computer is a "modify node" for directories and file attributes, and two other servers are "fetch nodes" for the directories and file attributes.

FIG. 19, for example, shows a geographically distributed data processing system having a first server computer 211 functioning as a modify node, a second server computer 212 functioning as a fetch node, and a third server computer 213 functioning as a fetch node. The second server computer 212 is physically spaced from the first server computer 211 by a distance "$d_1$" greater or equal to ten kilometers. The third server computer 213 is physically spaced from the first server computer 211 by a distance "$d_2$" greater or equal to ten kilometers. The distance "$d_2$" can be substantially greater the distance "$d_1$" so that the data transmission delay "$L_2$" from the first server computer 211 to the third server computer 213 is substantially greater than the data transmission delay "$L_1$" from the first server computer 211 to the second server computer 212. For example, as shown in FIG. 19, the distance "$d_1$" is one-hundred kilometers, and the distance "$d_2$" is two-hundred kilometers.

In the system of FIG. 19, the first server computer 211 is programmed with a first set of computer instructions 228, and stores a read-write copy 217 of a dataset. The second server computer 212 is programed with a second set of computer instructions 229, and stores a read-only copy 218 of the dataset. The third server computer 213 is programed with a third set of computer instructions 230, and stores a read-only copy 219 of the dataset. The dataset, for example, contains file system directories and file attributes of a directory tree. This directory tree is one of many "file system cells" in a global file system. The file system cells are linked together to form the global file system, for example, as described in Venkatesh, et al., U.S. Pat. No. 6,985,914 issued Jan. 10, 2006, entitled "Cluster meta file system of file system cells managed by respective data movers of a network file server," incorporated herein by reference. The three server computers 211, 212, 213 are located in different geographic locations to best serve the clients 214, 215, 216 most frequently accessing the file system cell. The first server computer 211, functioning as the modify node, is disposed at the most central location of the three server computers 211, 212, 213.

The first server computer 211 and the second server computer 212 are constructed and linked together generally as shown in FIGS. 1-3 and described above. The first server computer 211 in FIG. 19 corresponds to the first server 21 of FIG. 1, and the second server computer 212 in FIG. 19 corresponds to the second server computer 23 of FIG. 1. The first server computer 211 transmits changes to the dataset over a first data transmission link 223 to the second server computer 212, and the second server computer writes these changes into the read-only copy 218. The changes to the dataset include directory updates and file attribute updates.

The third server computer 213 is constructed and linked to the first server computer 211 in a fashion similar to the second server computer 212. The first server computer 211 also transmits the changes to the dataset over a second data transmission link 224 to the third server computer 213, and the third server computer writes these changes into the read-only copy 219 of the dataset.

The first server computer 211 is linked to a first client computer 214 for receiving read and write requests from the first client computer. The first server computer 211 services these requests by accessing the read-write copy 217 of the dataset. For example, these read and write requests include directory and file attribute lookup requests, and directory and file attribute update requests. In the case of a read request, the first server computer returns requested data to the first client computer 214. In the case of a write request, the first server computer 211 returns an acknowledgement of completion of the write request to the first client computer 214.

The second server computer 212 is linked to a second client computer 215 for receiving read and write requests from the second client computer. The second server computer 212 services the read requests by reading data from the read-only copy 218. The second server computer 212 services the write requests by forwarding the write requests to the first server computer 211. The forwarded write requests are transmitted over a data transmission link 225 that parallels the data transmission link 223. In response to each forwarded write request, the first server computer 211 performs a write access upon the read-write copy 217. Changes of this write operation are transmitted over the first data transmission link 223 back to the second server computer 212, and written into the read-only copy 218 of the dataset. Changes of this write operation are also transmitted over the second data transmission link 224 to the third server computer 213, and written into the read-only copy 219 of the dataset. The first server computer 211 also returns an acknowledgement of completion of the forwarded write request to the second server computer 212, which returns this acknowledgement to the second client computer 215.

The third server computer 213 is linked to a third client computer 215 for receiving read and write requests from the third client computer. The third server computer 213 services the read requests by reading data from the read-only copy 219. The second server computer 213 services the write requests by forwarding the write requests to the first server computer 211. The forwarded write requests are transmitted over a data transmission link 226 that parallels the data transmission link 224. In response to each forwarded write request, the first server computer performs a write access upon the read-write copy 217. Changes of this write operation are transmitted over the second data transmission link 224 back to the third server computer 213, and written into the read-only copy 219 of the dataset. Changes of this write operation are also transmitted over the first data transmission link 223 to the second server computer 212, and written into the read-only copy 218 of the dataset.

In the system of FIG. 19, because the dataset is a directory tree in a file system, it is most likely that read access is frequent and write access is infrequent. In this case, the write delay should be the maximum data transmission delay "$L_{max}$" of the data transmission delays "$L_1$" and "$L_2$", and the read delay should be zero. The write delay should be the maximum "$L_{max}$" of the data transmission delays "$L_1$" and "$L_2$" in order to reduce performance degradation at the client computer 215, 216 local to the second or third server computer 212, 213 having the maximum data transmission delay from the first server computer.

Figure 20:
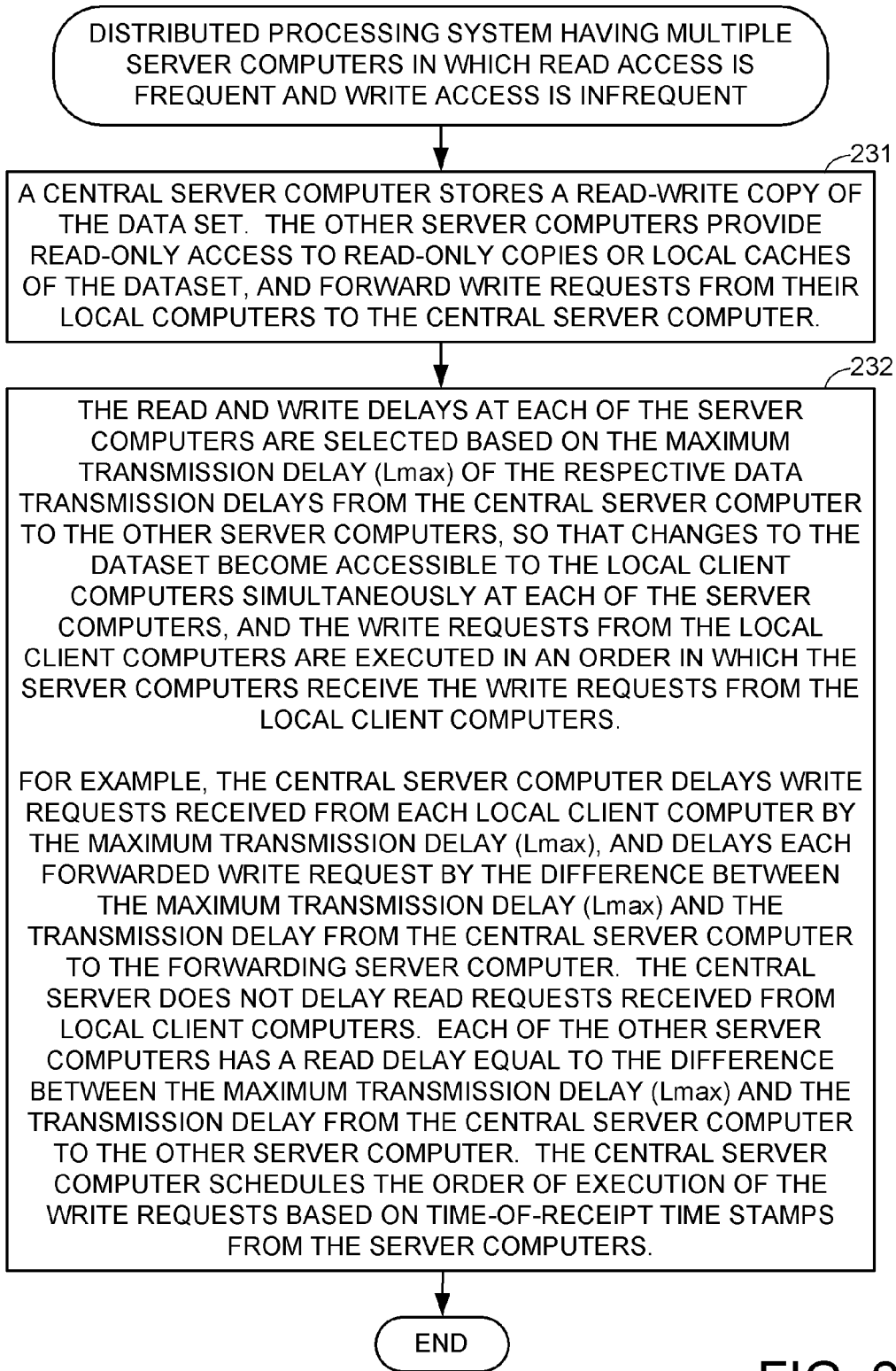
FIG. 20 is a flowchart of a method of processing read and write requests in the system of FIG. 14 for the case in which read access is frequent, write access is infrequent, and it is desired to give all of the client computers equal access to the dataset.

FIG. 20 shows a way of handling the client write requests in the system of FIG. 19 for the case of frequent read access and infrequent write access in order to give the client computers equal access performance at each of the server computers for read operations and also equal access performance at each of the server computers for write operations. In a first step 231, a central server computer stores a read-write copy of the dataset. The other server computers provide read-only access to read-only copies or local caches of the dataset, and forward write requests from their local client computers to the central server computer. If the other server computers provide read-only access to local caches of the dataset, then there will be some decrease in read access performance at these other server computers due to occurrences of a "cache miss".

Next, in step 232, the read and write delays at each of the server computers are selected based on the maximum transmission delay ($L_{max}$) of the respective transmission delays from the central server to the other server computers, so that changes to the dataset become accessible to the local client computers simultaneously at each of the server computers, and the write requests from the local client computers are executed in an order in which the server computers receive the write requests from the local client computers.

For example, so that changes to the dataset become accessible to the local server computers simultaneously at each of the server computers, the central server computer delays write requests received from each local client computer by the maximum transmission delay ($L_{max}$), and delays each forwarded write request from each forwarding server computer by the difference between the maximum transmission delay ($L_{max}$) and the transmission delay from the central server computer to the forwarding server computer. The central server computer does not delay read requests received from local client computers. Each of the other server computers has a read delay equal to the difference between the maximum transmission delay ($L_{max}$) and the transmission delay from the central server computer to the other server computer.

For example, if the distance "$d_2$" is twice the distance "$d_1$" as shown in FIG. 19, so that "$L_{max}$" is "$L_2$" which greater than "$L_1$", then the write delay in the first server computer 211 is "$L_2$" for write requests received from the first client computer 214, the read delay in the second server 212 is "$L_2-L_1$", and the read delay in the third server computer 213 is zero, so that the changes to the dataset become accessible to the second client computer 215 and the third client computer 216 simultaneously at the second server computer 212 and the third server computer 213.

For example, so that the write requests from the local client computers are executed in the order in which the server computers receive the write requests from the local client computers, each server computer time stamps each write request when the server computer receives the write request from the originating local client computer, and the write requests forwarded to the central server computer include these time-of-receipt time stamps. The central server computer schedules the order of execution of the write requests based on the time-of-receipt time stamps.

For example, if the distance "$d_2$" is twice the distance "$d_1$" as shown in FIG. 19, so that "$L_{max}$" is "$L_2$" which greater than "$L_1$", then the write delay in the first server computer 211 is "$L_2-L_1$" for write requests forwarded from the second server computer 212, and the write delay in the first server computer is zero for write requests forwarded from the third client computer 213.

For the global file system application of FIG. 19, step 232 could be modified to use a read delay of zero at of the server computers in order to reduce the latency. This would give a relative advantage to the fetch nodes closer to the modify node. For some other applications, however, it is desired to have equal performance of read access at all nodes and equal performance of write access at all nodes so that none of the client computers have a relative advantage over other client computers. For example, in a computer trading system, equal performance at all nodes would discourage unfair trading practices.

In view of the above, read delay or write delay is added to server computers of a geographically distributed data processing system so that when writing to a dataset occurs at a first server computer and reading from the dataset occurs at a second server computer, the sum of any delay of returning an acknowledgement of completion of each write request and any delay in the reading of data for each read request is at least the data transmission delay between the two server computers. For certain client applications, the added delay is sufficient to compensate for the transmission delay without the use of a conventional read lock, which would require a round-trip delay. The method can also provide an up-to-date global view of the dataset at each of the server computers. For example, the dataset includes directories and file attributes of a global file system, the client application is NFS, and a write delay equal to the data transmission delay compensates for the transmission delay to reduce performance degradation. For an application such as a computer trading system, the method can also provide equal performance of read access at each of the server computers and equal performance of write access at each of the server computers.

What is claimed is:

1. A method in a geographically distributed data processing system having a first server computer linked to a first client computer, a second server computer linked to a second client computer, and a data transmission link from the first server computer to the second server computer, the second server computer being physically spaced from the first server computer by more than ten kilometers so that there is a data transmission delay from the first server computer to the second server computer, the first server computer having a first data processor and program storage media storing a first set of computer instructions, and the second server computer having a second data processor and program storage media storing a second set of computer instructions, the method comprising:

the first data processor executing the first set of computer instructions to respond to write requests from the first client computer by writing a series of changes to a dataset and returning to the first client computer an acknowledgement of completion of each of the write requests, and transmitting the series of changes to the dataset over the data transmission link to the second data processor; and the second data processor executing the second set of computer instructions to receive the series of changes to the dataset from the first data processor, and to respond to read requests from the second client computer to read data from the dataset and return the data read for each of the read requests to the second client computer, wherein execution of at least one of the first set of computer instructions by the first data processor and the second set of computer instructions by the second data processor delays at least one of the returning to the first client computer the acknowledgement of completion of each of the write requests and the reading of the data from the dataset for each of the read requests so that the sum of any delay of the returning to the first client computer the acknowledgement of completion of each of the write requests and any delay in the reading of the data from the dataset for each of the read requests is at least the data transmission delay from the first server computer to the second server computer, so that the read data returned for said each of the read requests includes changes for write requests acknowledged as completed by the first data processor before said each of the read requests is received by the second data processor, and the read data returned for said each of the read requests does not include changes for write requests received by the first data processor after said each of the read requests is received by the second data processor, which further includes measuring write access frequency upon the dataset, measuring read access frequency upon the dataset, and selecting delay in either the returning to the first client computer the acknowledgement of completion of each of the write requests or in the reading of the data from the dataset for each of the read requests in response to the measured write access frequency upon the dataset and the measured read access frequency upon the dataset so that the less frequent of the write access upon the dataset or the read access upon the dataset is delayed for at least the data transmission delay from the first server computer to the second server computer.

2. A method in a geographically distributed data processing system having a first server computer linked to a first client computer, a second server computer linked to a second client computer, and a data transmission link from the first server computer to the second server computer, the second server computer being physically spaced from the first server computer by more than ten kilometers so that there is a data transmission delay from the first server computer to the second server computer, the first server computer having a first data processor and program storage media storing a first set of computer instructions, and the second server computer having a second data processor and program storage media storing a second set of computer instructions, the method comprising:

the first data processor executing the first set of computer instructions to respond to write requests from the first client computer by writing a series of changes to a dataset and returning to the first client computer an acknowledgement of completion of each of the write requests, and transmitting the series of changes to the dataset over the data transmission link to the second data processor; and the second data processor executing the second set of computer instructions to receive the series of changes to the dataset from the first data processor, and to respond to read requests from the second client computer to read data from the dataset and return the data read for each of the read requests to the second client computer, wherein execution of at least one of the first set of computer instructions by the first data processor and the second set of computer instructions by the second data processor delays at least one of the returning to the first client computer the acknowledgement of completion of each of the write requests and the reading of the data from the dataset for each of the read requests so that the sum of any delay of the returning to the first client computer the acknowledgement of completion of each of the write requests and any delay in the reading of the data from the dataset for each of the read requests is at least the data transmission delay from the first server computer to the second server computer, so that the read data returned for said each of the read requests includes changes for write requests acknowledged as completed by the first data processor before said each of the read requests is received by the second data processor, and the read data returned for said each of the read requests does not include changes for write requests received by the first data processor after said each of the read requests is received by the second data processor, which further includes measuring write access frequency upon the dataset, measuring read access frequency upon the dataset, and adjusting delay in the returning to the first client computer the acknowledgement of completion of each of the write requests and delay in the reading of the data from the dataset for each of the read requests in response to the measured write access frequency upon the dataset and the measured read access frequency upon the dataset so that a majority of the delay is in the less frequent of the write access upon the dataset or the read access upon the dataset.

3. The method as claimed in claim 2, which further includes calculating statistics from the measured write access frequency and the measured read access frequency to provide an indication of overlap between a frequency distribution of the write requests upon the dataset and a frequency distribution of the read requests upon the dataset, and using the statistics to divide the data transmission delay from the first server computer to the second server computer between the delay in writing to the dataset and the delay in reading from the dataset.

4. A geographically distributed data processing system comprising:

a first server computer for servicing requests from a first client computer;

a second server computer for servicing requests from a second client computer; and a data transmission link from the first server computer to the second server computer;

wherein the second server computer is physically spaced from the first server computer by more than ten kilometers so that there is a data transmission delay from the first server computer to the second server computer;

wherein the first server computer has a first data processor and program storage media storing a first set of computer instructions executed by the first data processor;

wherein the second server computer has a second data processor and program storage media storing a second set of computer instructions executed by the second data processor; and the first set of computer instructions, when executed by the first data processor, respond to write requests from the first client computer by writing a series of changes to a dataset and returning to the first client computer an acknowledgement of completion of each of the write requests, and transmitting the series of changes to the dataset over the data transmission link to the second data processor; and the second set of computer instructions, when executed by the second data processor, receive the series of changes to the dataset from the first data processor, and respond to read requests from the second client computer to read data from the dataset and return the data read for each of the read requests to the second client computer, wherein execution of at least one of the first set of computer instructions by the first data processor and the second set of computer instructions by the second data processor delays at least one of the returning to the first client computer the acknowledgement of completion of each of the write requests and the reading of the data from the dataset for each of the read requests so that the sum of any delay of the returning to the first client computer the acknowledgement of completion of each of the write requests and any delay in the reading of the data from the dataset for each of the read requests is at least the data transmission delay from the first server computer to the second server computer, so that the read data returned for said each of the read requests includes changes for write requests acknowledged as completed by the first data processor before said each of the read requests is received by the second data processor, and the read data returned for said each of the read requests does not include changes for write requests received by the first data processor after said each of the read requests is received by the second data processor, and wherein execution of at least one of the first set of computer instructions by the first data processor and the second set of computer instructions by the second data processor measures write access frequency upon the dataset, measures read access frequency upon the dataset, and adjusts delay in the returning to the first client computer the acknowledgement of completion of each of the write requests and delay in the reading of the data from the dataset for each of the read requests in response to the measured write access frequency upon the dataset and the measured read access frequency upon the dataset so that a majority of the delay is in the less frequent of the write access upon the dataset or the read access upon the dataset.

5. The distributed data processing system as claimed in claim 4, wherein execution of the first set of computer instructions by the first data processor delays the returning to the first client computer the acknowledgement of completion of each of the write requests, the delay in the returning to the first client computer the acknowledgement of completion of each of the write requests is an interval of time from the receipt of said each of the write requests by the first data processor to the returning to the first client computer the acknowledgement of completion of said each of the write requests, execution of the second set of computer instructions by the second data processor delays the reading of the data from the dataset for each of the read requests, the delay in the reading of the data from the dataset for said each of the read requests is an interval of time from the receipt of said each of the read requests by the second data processor to the returning to the second client computer the data read for said each of the read requests to the second client computer, and the read data returned for said each of the read requests includes changes for write requests acknowledged as completed by the first data processor before said each of the read requests is received by the second data processor so that the second data processor gives read access to a version of the dataset that changes when the first data processor returns to the first client computer the acknowledgement of completion of each of the write requests.

6. The distributed data processing system as claimed in claim 4, wherein execution of at least one of the first set of computer instructions by the first data processor and the second set of computer instructions by the second data processor calculates statistics from the measured write access frequency and the measured read access frequency to provide an indication of overlap between a frequency distribution of the write requests upon the dataset and a frequency distribution of the read requests upon the dataset, and using the statistics to divide the data transmission delay from the first server computer to the second server computer between the delay in writing to the dataset and the delay in reading from the dataset.

\* \* \* \* \*